United States Patent [19]
Ota et al.

[11] Patent Number: 6,028,578
[45] Date of Patent: Feb. 22, 2000

[54] ACTIVE MATRIX TYPE LIQUID CRYSTAL DISPLAY SYSTEM AND DRIVING METHOD THEREFOR

[75] Inventors: Masuyuki Ota; Katsumi Kondo, both of Katsuta; Masahito Oh-e, Hitachi, all of Japan

[73] Assignee: Hitachi, Ltd., Tokyo, Japan

[21] Appl. No.: 09/184,004

[22] Filed: Nov. 2, 1998

Related U.S. Application Data

[63] Continuation of application No. 08/374,513, Jan. 13, 1995, Pat. No. 5,854,616.

[51] Int. Cl.[7] .................................................. G09G 3/36
[52] U.S. Cl. .............................................. 345/94; 345/100
[58] Field of Search .............................. 345/92, 94, 95, 345/100; 349/43, 74, 86, 89, 112, 123, 177

[56] References Cited

U.S. PATENT DOCUMENTS

| | | | |
|---|---|---|---|
| 4,936,656 | 6/1990 | Yamashita | 345/92 |
| 5,012,228 | 4/1991 | Masuda et al. | 345/92 |
| 5,095,304 | 3/1992 | Young | 345/94 |
| 5,151,805 | 9/1992 | Takeda et al. | 345/94 |
| 5,414,443 | 5/1995 | Kanatami et al. | 345/95 |
| 5,434,599 | 7/1995 | Hirai et al. | 345/94 |
| 5,512,336 | 4/1996 | Yamahara | 345/94 |
| 5,539,547 | 7/1996 | Ishii et al. | 349/123 |
| 5,576,857 | 11/1996 | Takemura | 349/86 |
| 5,598,285 | 1/1997 | Kondo et al. | 345/92 |
| 5,606,342 | 2/1997 | Shoji et al. | 345/92 |
| 5,642,213 | 6/1997 | Mase et al. | 349/434 |
| 5,644,415 | 7/1997 | Aoki et al. | 349/122 |

FOREIGN PATENT DOCUMENTS

| | | |
|---|---|---|
| 63-225284 | 9/1988 | Japan . |
| 2-293722 | 12/1990 | Japan . |
| 3-168617 | 7/1991 | Japan . |
| 4-294322 | 10/1992 | Japan . |
| 4-299867 | 10/1992 | Japan . |
| 2 134 300 | 8/1984 | United Kingdom . |

*Primary Examiner*—Amare Mengistu
*Attorney, Agent, or Firm*—Antonelli, Terry, Stout & Kraus, LLP

[57] ABSTRACT

A thin film transistor type liquid crystal display system which is low in power dissipation in brightness, high in image quality without cross-talk. A thin film transistor type liquid crystal display system comprises electrodes for applying electric field nearly in parallel to the surface of a substrate, a liquid crystal composition, element structure for obtaining light state and dark state through polarization means, driving means for output a scanning signal having at least two kinds of non-selective voltage values to scanning electrodes.

28 Claims, 28 Drawing Sheets

ACTIVE MATRIX TYPE LIQUID CRYSTAL DISPLAY SYSTEM AND DRIVING METHOD THEREFOR

CROSS REFERENCE TO RELATED APPLICATION

This is a continuation of U.S. application Ser. No. 08/374,513, filed Jan. 13, 1995, now U.S. Pat. No. 5,854,616 the subject matter of which is incorporated by reference herein.

BACKGROUND OF THE INVENTION

1. Field of the Invention

The present invention relates to an active matrix type liquid crystal display system such as a display unit used in a personal computer and a driving method therefor.

2. Description of the Prior Art

At present, active matrix type (thin film transistor type) liquid crystal display systems are widely used in a great variety of use, and required to be improved in multi-level half-tone (full color).

As a display type for liquid crystal display system, there is so-called twisted nematic display type (thereinafter referred to as "vertical electric field type") wherein liquid crystal is filled between two substrates facing to each other having a flat display electrode on each of the facing surfaces of the substrates, electric field nearly normal to the substrate surface being applied to the liquid crystal to drive. The liquid crystal display system of this type has been already in the market.

On the other hand, another new different type has been proposed, for example, in Japanese Patent Publication No. 63-21907 (1988), wherein a pair of electrodes for applying electric field to liquid crystal are formed on an identical substrate, liquid crystal being driven by applying the electric field to the liquid crystal in the direction approximately parallel to the surfaces of substrate (thereinafter referred to as "parallel electric field type").

In order to produce multi-level halftone display in a thin transistor type liquid crystal display system, the voltage output from the circuit for supplying image signal to signal electrodes, that is, a signal driver IC, needs to have a multi-level output value corresponding to the number of the multi-level halftone. In a case of producing, for example, 16 levels of halftone, the signal driver IC needs to be capable of supplying 16×2 (binary values of positive and negative are required for each halftone, since liquid crystal needs to be driven with alternating current.)=32 values of output voltages. Since the signal driver IC has operation amplifiers in the output stages each in order to be capable of supplying sufficient current, it is necessary to provide 32 operation amplifiers in the above case. The smaller the operation amplifier in the output stage can be made and consequently the smaller the signal driver IC can be made, the lower the absolute maximum supply is. Although the productivity of the signal driver IC may be improved and the size of the outer frame portion of the display system may be made small by means of deceasing the size of the signal driver IC, the maximum output voltage for the signal voltage needs to be decreased.

On the other hand, in the parallel electric field type the voltage is applied to the liquid crystal layer with a pair of non-transparent line-shaped electrodes formed on an identical substrate although in the vertical electric field type described above the voltage is applied to the liquid crystal layer with a pair of transparent flat-shaped electrodes facing to each other. Consequently, in the parallel electric field type the opening ratio becomes small. In this reason, since the distance between the two electrodes cannot be so small, the distance between the two electrodes is larger than and the magnitude of electric field in the parallel electric field type is weaker than those in the vertical electric field type. In order to produce the same magnitude of the strength of electric field, therefore, the former needs to apply higher voltage between the electrodes than the latter.

An object of the present invention is to provide an active matrix type liquid crystal display system of parallel electric field type and a driving method thereof in which the display system is operable with a practically sufficiently low drive voltage of signal side drive circuit. Another object of the present invention is to provide an active matrix type liquid crystal display system of parallel electric field type and a driving method thereof in which cross-talk, especially, lateral smear does not appear and high image quality can be attained.

SUMMARY OF THE INVENTION

In order to attain the above objects, according to the present invention, the structure of an active matrix type liquid crystal display system is as follows.

(1) An active matrix type liquid crystal display system, wherein a liquid crystal composition is interposed between a first and a second substrates, a plurality of pixel parts being constructed with a plurality of scanning electrodes and a plurality of signal electrodes arranged in a matrix, switching element being provided in each of the pixel parts where a switching element is formed.

The pixel electrode and a counter electrode connected to the switching element are placed such a way that the electric field is applied in parallel to the substrate, the liquid crystal in the liquid crystal composition layer being driven with the voltage applied between the electrodes in keeping the major axes of the liquid crystal molecules parallel to the surface of the substrate, the system having the element structure capable of obtaining a light state of the liquid crystal composition and a dark state with orientation state and the polarize means, having drive means capable of putting out a scanning signal having more than two non-selective voltage in the scanning electrode.

(2) According to another feature of the present invention, an active matrix type liquid crystal display system, wherein the counter electrode is a common electrode provided separately from the scanning electrode, the signal electrode, the pixel electrode.

(3) According to a further feature of the present invention, an active matrix type liquid crystal display system, wherein the counter electrode is a part of the scanning electrode adjacent to the pixel part.

(4) According to a further feature of the present invention, an active matrix type liquid crystal display system, wherein the relation between the threshold value $V_{TH}$ for the switching transistor element and the maximum voltage $V_{ON}$ between the pixel electrode and the counter electrode for obtaining light state or dark state satisfies the following equation.

$$V_{TH} > |V_{ON}|$$

(5) According to a further feature of the present invention, an active matrix type liquid crystal display system, wherein the relation among the threshold value $V_{TH}$ for the switching transistor element, the maximum voltage $V_{ON}$ between the pixel electrode and the counter electrode for obtaining light state or dark state and the minimum voltage $V_{OFF}$ between the pixel electrode and the counter electrode for obtaining light state or dark state satisfies the following equation.

$$V_{TH} > (|V_{ON}| - |V_{OFF}|)/2$$

(6) According to a further feature of the present invention, an active matrix type liquid crystal display system, wherein the switching transistor elements are constructed so aligned as to have p-type and n-type characteristic in alternate order by every row.

(7) According to a further feature of the present invention, an active matrix type liquid crystal display system, wherein at least two of the switching transistor elements are formed in a pixel, at least one of the source electrode or the drain electrode of the thin film transistor element being connected to the signal electrode, at least one of the source electrode or the drain electrode of the thin film transistor element being electrically connected to the scanning electrode in the immediately following row.

(8) According to a further feature of the present invention, an active matrix type liquid crystal display system, wherein at least two of the switching transistor elements are formed in a pixel, at least one of the source electrode or the drain electrode of the thin film transistor element being connected to the signal electrode, at least one of the source electrode or the drain electrode of the thin film transistor element being connected to the scanning electrode in the immediately following row through a capacitive element.

(9) According to a further feature of the present invention, an active matrix type liquid crystal display system, wherein the liquid crystal composition, the direction of rubbing, the configuration of the polarization plate, the distances between the substrates, and the distance between the pixel electrode and the counter electrode are set such that the difference between the voltage for obtaining light state and the voltage for obtaining dark state becomes below 5V.

(10) According to a further feature of the present invention, an active matrix type liquid crystal display system, wherein the scanning signal outputs at least two kinds of the non-selective voltage values.

(11) According to a further feature of the present invention, an active matrix type liquid crystal display system, wherein the voltage in the pixel electrode is changed by means of changing the non-selective voltage for the scanning signal applied to the scanning electrode mainly through the capacitance between the scanning electrode and the pixel electrode.

(12) According to a further feature of the present invention, an active matrix type liquid crystal display system, wherein the non-selective voltages of the scanning signals applied to the scanning electrodes in all of the rows are changed with the identical amplitude, the identical cycle and the identical phase.

(13) According to a further feature of the present invention, an active matrix type liquid crystal display system, wherein scanning signal, which has binary values of the non-selective voltages in alternate order by every frame and being kept at a constant voltage during non-selective period, is applied to the scanning electrode, the signal electrode receiving the image signal transmitted in such a way that the polarity of the voltage between the pixel electrode and the counter electrode differs in alternate order by every row.

(14) According to a further feature of the present invention, an active matrix type liquid crystal display system, wherein the voltage difference between the two kinds of non-selective voltage values is set equal to the sum of the maximum voltage $V_{ON}$ between the pixel electrode and the counter electrode for obtaining light state or dark state and the minimum voltage $V_{OFF}$ between the pixel electrode and the counter electrode for obtaining light state or dark state.

(15) According to a further feature of the present invention, an active matrix type liquid crystal display system, wherein the voltage difference between the two kinds of non-selective voltage values is set equal to the half of the sum of the maximum voltage $V_{ON}$ between the pixel electrode and the counter electrode for obtaining light state or dark state and the minimum voltage $V_{OFF}$ between the pixel electrode and the counter electrode for obtaining light state or dark state.

(16) According to a further feature of the present invention, an active matrix type liquid crystal display system, wherein the central voltage of the non-selective voltage in the scanning signal applied to the scanning electrode having p-type switching transistor element is higher than the central voltage of the non-selective voltage in the scanning signal applied to the scanning electrode having n-type switching transistor element, the voltage difference exceeding the maximum voltage $V_{ON}$ between the pixel electrode and the counter electrode for obtaining light state and dark state.

(17) According to a further feature of the present invention, an active matrix type liquid crystal display system, wherein the counter electrode voltage is supplied from the scanning electrode.

(18) According to a further feature of the present invention, an active matrix type liquid crystal display system, wherein the counter electrode voltage supplied from the scanning electrode changes according to the polarity of the image signal voltage.

The operations of the present invention will be described below.

The following operations of the present invention are produced by changing the non-selective voltage (OFF voltage) in the scanning signal supplied to the scanning electrode during non-selective period, and employing the parallel electric field type as the drive type for changing the voltage in the pixel electrode through the capacitive coupling between the pixel electrode and the scanning electrode, which has been discovered by the inventors of the present invention.

(First operation)

In parallel electric field type, the capacity $C_{LC}$ between the pixel electrode and the common electrode is smaller than that in vertical electric field type, because in the vertical electric field type the pixel electrode and the counter electrode forms a parallel plane capacitance. Therefore, in the parallel electric field type, the capacitance $C_S$ between the pixel electrode and the scanning electrode is relatively larger than the capacitance $C_{LC}$ between the pixel electrode and the counter electrode, and consequently a sufficient bias voltage can be applied to the pixel electrode depending on voltage change in the scanning electrode. Thereby, the ratio of the area occupied by the capacitance element $C_S$ formed between the pixel electrode and the scanning electrode to the area of the one pixel element can be decreased, which improves the opening ratio.

(Second operation)

Since the capacity $C_{LC}$ between the pixel electrode and the counter electrode is small, the load capacity of the scanning electrode becomes small. Therewith, a driving method applying a modulation voltage to the scanning electrode has an advantage in that the distortion in the modulation wave form is small. Thereby, the ratio of the load capacity in the scanning electrode changed depending on image is decreased, and the ratio of the wave form deformation in the non-selective voltage for the scanning signal is also decreased. Therefore, the modulating voltage can be applied uniformly, occurrence of cross-talk (horizontal smear in which horizontally drawn lines appear) can be suppressed.

(Third operation)

In the parallel electric field type, the adjacent scanning electrode can be used as a counter electrode. Therewith, the area to be used by trunk part of the counter electrode may be used for the opening part to increase the opening ratio. Further, the number of cross points in the interconnecting electrode is decreased, which decreases short circuit failure in the electrodes.

In order to drive the liquid crystal with alternating current, image signal is charged into the signal electrode in such a manner that the voltage wave form charged in the pixel electrode against the counter electrode becomes an alternating wave form. However, the typical active element used in the active matrix type liquid display system, such as amorphous silicon thin film transistor (a-SiTFT), poly-silicon thin film transistor (p-SiTFT) and so on, has a characteristic where drain current initiates to flow at the scanning voltage of approximately 0V, that is, the threshold voltage $V_{TH}$ is approximately 0V. Therefore when the non-selective voltage for the scanning voltage (OFF level) is used as the counter electrode voltage, the transistor element described above cannot keep negative voltage against the counter electrode voltage even if it is charged. The reason is that since the OFF level of the scanning voltage is in a higher level than the voltage of the pixel electrode, the transistor element having the threshold voltage $V_{TH}$ of approximately 0V enters into ON state, the voltage of the pixel electrode decreases up to the OFF level for the scanning voltage through leakage. Therefore, in order to drive the liquid crystal with alternating current, it is required to provide a counter electrode separately to set the counter electrode voltage higher than the OFF level of the scanning voltage. By means of employing a transistor having a high threshold voltage, it becomes possible to drive the liquid crystal with alternating current since the pixel electrode can be charged and kept in a negative voltage against the counter voltage even when the scanning electrode is used as a counter electrode and the OFF level of the scanning voltage being used as a counter electrode voltage. The present invention is characterized that the threshold value $V_{TH}$ for the switching transistor element exceeds the maximum voltage $V_{ON}$ applied to the liquid crystal or the half of the difference between the maximum voltage $V_{ON}$ and the minimum voltage $V_{OFF}$ Therewith, even if a negative voltage is applied to the liquid crystal, the pixel electrode voltage does not leak but is kept, the liquid crystal being driven with alternating current and with low voltage.

Further, the transistor elements are constructed such as to have p-type or n-type characteristic every other row, the central voltage of the non-selective voltage in the scanning signal applied to the scanning electrode having p-type switching transistor element being higher than the central voltage of the non-selective voltage in the scanning signal applied to the scanning electrode having n-type switching transistor element, the voltage difference exceeding the maximum voltage $V_{ON}$ between the pixel electrode and the counter electrode for obtaining light state or dark state. Therewith, even if the threshold voltage $V_{TH}$ is near 0V or lower than 0V, the liquid crystal can be driven with alternating current and with low voltage.

Furthermore, two thin film transistor elements are constructed in a pixel, image signal voltage being supplied from one of the thin film transistor element, counter electrode voltage being supplied from the other thin film transistor element. Therewith, the liquid crystal can be driven with alternating current. Further, by means of changing the counter electrode voltage corresponding to the polarity of image signal voltage, the liquid crystal can be driven with low voltage.

DETAILED DESCRIPTION OF THE PREFERRED EMBODIMENT

[Embodiment 1]

Figure 1:
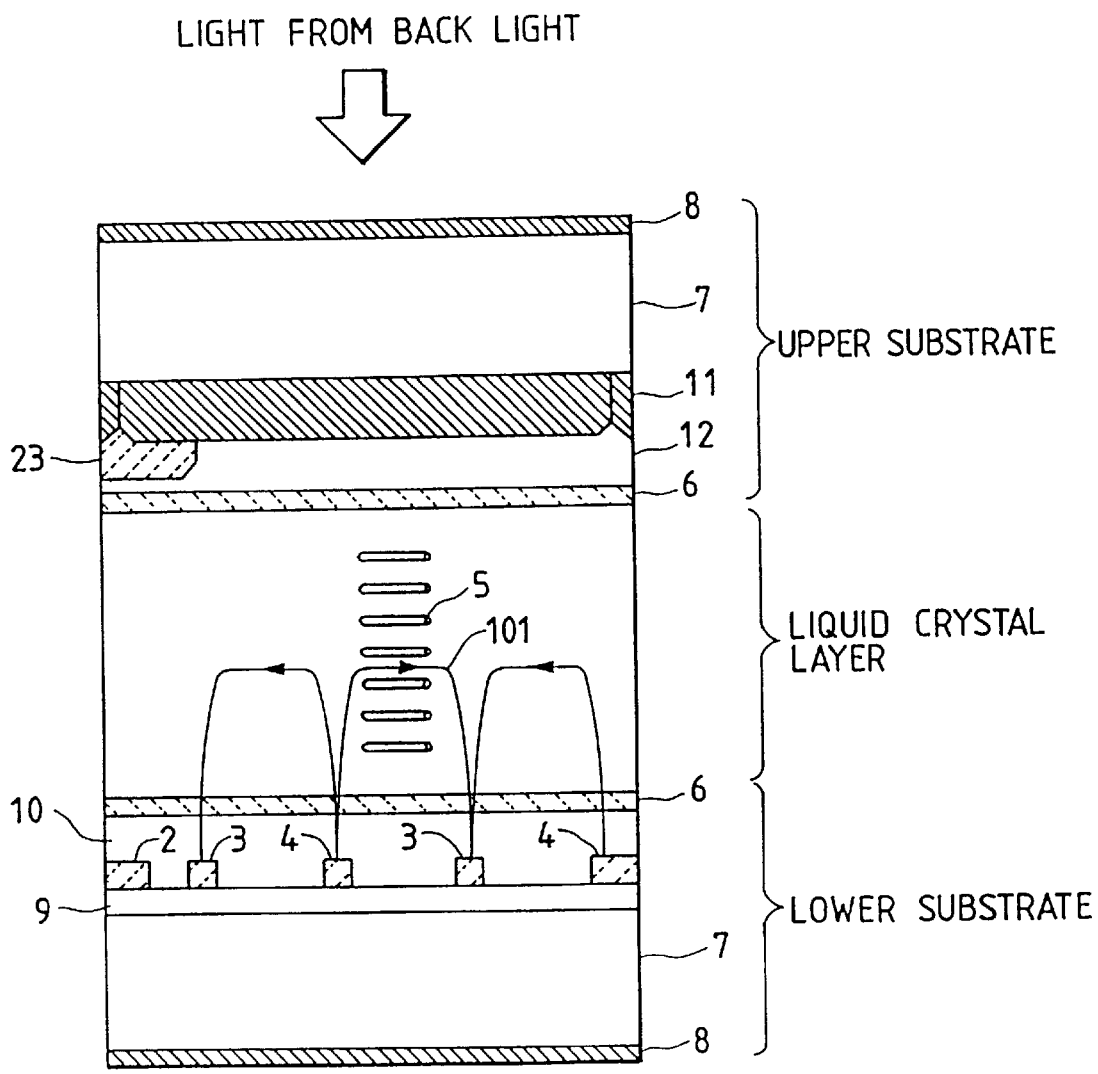
FIG. 1 is a cross-sectional view of Embodiment 1 of a liquid crystal display system in accordance with the present invention, taken along the line 1—1 in FIG. 3.

FIG. 1 shows the cross-sectional structure of one pixel region in a liquid crystal display panel. The liquid crystal panel comprises an upper substrate, a lower substrate and a liquid crystal layer filled between the gap between the both. By applying voltage between a pixel electrode 3 and a counter electrode 4 formed on the lower substrate, the electric field produced between both of the electrodes is controlled to control the orientation state of the liquid crystal and change the transmitting ratio of light from a back light passing through the panel. When seeing from the opposite side of the back light in the liquid crystal panel, light state, dark state or middle state of the both is observed by means of controlling the voltage applied between the pixel electrode and the counter electrode. The pixel electrode and the counter electrode are extended in line-shape in the direction normal to the paper surface of FIG. 1, the distance between the both electrodes is approximately 15μm. Since the thickness of the liquid crystal layer is approximately 4μm and is smaller than the gap of 15pm between the pixel electrode and the counter electrode, the direction of the electric field 101 (line of electric force) produced inside the liquid crystal layer becomes nearly the lateral direction of FIG. 1 (FIG. 1 is a figure expanded in the thickness direction of the display panel comparing to the actual system).

FIG. 31 schematically shows the orientation states of the liquid crystal molecules in the cases of applying and not applying voltage between the pixel electrode 3 and the counter electrode 4. FIG. 31 (a) and (b) are views seeing the liquid crystal panel from the lateral direction, FIG. 31 (c) and (d) being views seeing from the top and the bottom. And FIG. 31 (a) and (c) are views when voltage is not applied, FIG. 31 (b) and (d) being views when voltage is applied. By applying different voltages to the pixel electrode and the counter electrode respectively to produce electric potential difference between the both and to apply electric field to the liquid crystal composition layer, the liquid crystal molecules react with the mutual reaction of the dielectric anisotropy of the liquid crystal composition and the electric field to change the orientation to the direction of the electric field. As shown in FIG. 1 and FIG. 31, polarization plates 8 are formed on the upper and the lower surfaces of the liquid crystal panel, and the transmitting ratio of light passing through the liquid crystal panel is changed by the mutual reaction of the anisotropy in refraction coefficient of the liquid crystal composition layer and the polarization plates. Therewith, the brightness in the display is changed.

Figure 32:
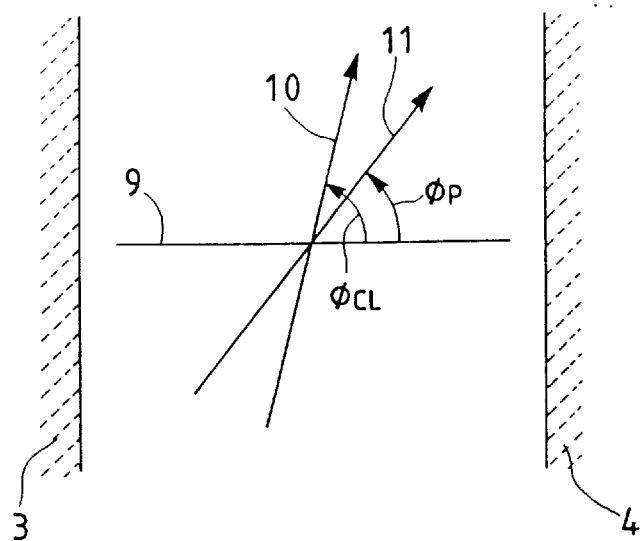
FIG. 32 is a view showing the angle of the direction of the orientation of molecular main axis (rubbing direction) $\phi_{LC}$ and the angle of the direction of polarization axis of the polarization plate $\phi_{LC}$ on the interface against the direction of electric field.

By FIG. 32, the angle of the direction 102 of the main axis of the liquid crystal molecule (optical axis) $\phi_{LC}$ near the interface and the angle of the direction 103 of polarization axis of the polarization plate $\phi_P$ against the direction of electric field 101 are defined. Since there are pairs of the polarization plate and liquid crystal interface in the top and in the bottom respectively, these angles are indicated by $\phi_{P1}$, $\phi_{P2}$, $\phi_{LC1}$, $\phi_{LC2}$ according to necessity. During lack of electric field, the liquid crystal molecules of rod-shape 5 are orientated in such a direction as to have a little angle against the longitudinal direction of the pixel electrode 3 and the counter electrode 4 (refer to the front view of FIG. 31 (c)), that is, 45 degrees $\leq |\phi_{LC}| < 90$ degrees. In FIG. 31 and FIG. 32, the direction of the main axis orientation (rubbing) 103 of the liquid crystal molecules on the interface is denoted by an arrow. It is a preferable condition for the direction of the main axis orientation of the liquid crystal molecules on the top and the bottom interfaces to be parallel to each other, that is, $\phi_{LC1} = \phi_{LC2} (= \phi_{LC})$. It is supposed here that the dielectric anisotropy of the liquid crystal composition is positive.

Figure 33:
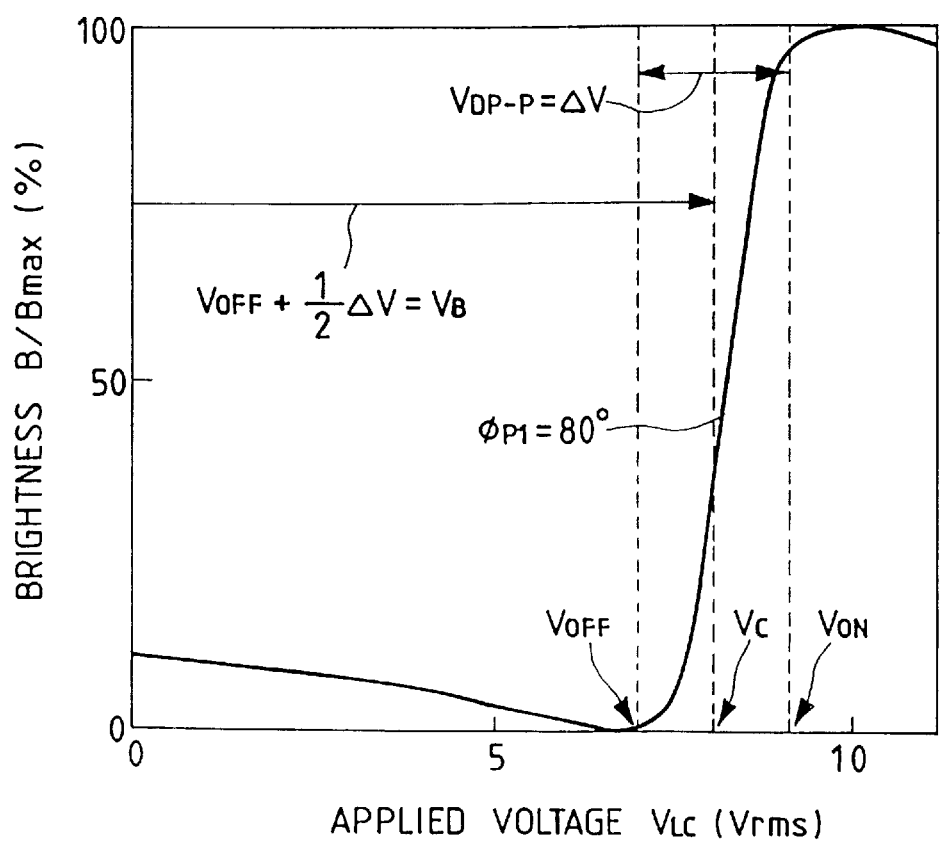
FIG. 33 is a graph showing the photo-electric characteristic in Embodiment in accordance with the present invention, being taken normally closed type as an example.
Figure 34:
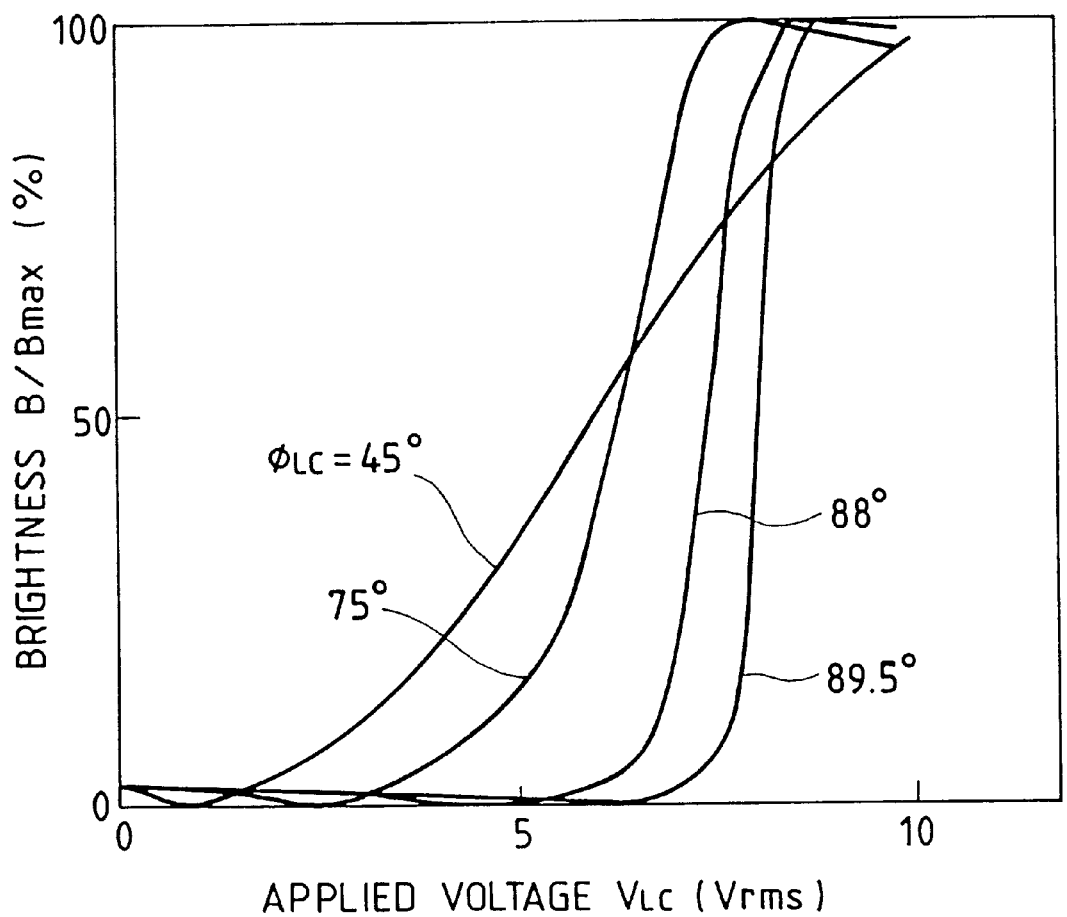
FIG. 34 is a view showing the dependence of photoelectric characteristic on the direction of the orientation of molecular main axis (rubbing direction) $\phi_{LC}$ on the interface, being taken normally closed type as an example.

FIG. 33 shows characteristic in the relation between the brightness and the voltage $V_{LC}$, being applied between the pixel electrode and the counter electrode, that is, so-called the photo-electric characteristic. The brightness in the ordinate is indicated by relative value when the maximum value for the brightness is set as 100%. As the applied voltage increases, the brightness sharply increases at the voltage $V_{OFF}$, and then the brightness monotonously increases up to near the voltage $V_{ON}$ as the applied voltage increases.

As shown in FIG. 1, further formed on the upper substrate are a color filter 11 for color display, a shielding film (black matrix) 23 for improving contrast by means of shielding the light passing through the noncontrol region against the light around a pixel (the region where the light transmitting ratio cannot be controlled by the voltage applied between the pixel electrode and the counter electrode), a flattening film 12 for flattening the surface of the substrate, and an orientation control film 6 for controlling the orientation of the liquid crystal molecules such as to orientate in a given direction when the voltage is not applied. These films are formed on a transparent substrate 7 such as glass, plastic resin and so on.

On the lower substrate, various kinds of interconnection a thin film transistor (TFT) for switching the voltage applied to the pixel electrode and so on are formed other than the pixel electrode or the counter electrode, which will be described later. These are formed on a transparent substrate 7 such as glass and so on similar to in the case of the upper substrate. In the embodiment, transparent glass substrates polished on their surfaces having thickness of, for example, 1.1 mm are used as the substrates 7. On one of the substrate, a thin film transistor is formed, and further an orientation film 6 is formed on the uppermost surface. In the embodiment, polyimide is employed as the orientation film 6, its surface being treated with rubbing for orientating the liquid crystal 5. On the other substrate, polyimide is also applied and treated with rubbing. The direction of rubbing on both of the upper and the bottom interfaces are nearly parallel to each other, and the angle of the rubbing against the direction of electric field is 88 degrees ($\phi_{LC1}=\phi_{LC2}=88°$). A nematic liquid crystal composition having dielectric anisotropy $\Delta\epsilon$ of positive and 4.5, an anisotropy of refractive index $\Delta\epsilon$ of 0.072 (589 nm, 20° C.) is interposed between the substrates. The gap d is 3.9 $\mu$m under filling of the liquid crystal and kept by means of dispersing and interposing spherical polymer beads. Therefore, $\Delta\cdot$nd becomes 0.281 $\mu$m. The panel is sandwiched with two polarization plates 8 [G1220DU, a product of Nitto Denkou Co.], the polarization transmitting axis in one of the polarization plates being set in such as to have a little angle against the direction of rubbing, that is, ($\phi_{P1}=80°$ (therefore, $|\phi_{LC1}-\phi_{P1}|=8°$), and the polarization transmitting axis in the other of the polarization plates being set in such as to intersect with the former in right angle, that is, $\phi_{P2}=-10°$. Therewith, it has been realized the characteristic where as the voltage $V_{LC}$ applied to the pixel according to the present invention (the voltage between the pixel electrode 3 and the counter electrode 4) increases from zero, the brightness decreases up to a minimum value (FIG. 33). The embodiment employs the normally closed characteristic where dark state is obtained at a low voltage ($V_{OFF}$) and light state at a high voltage ($V_{ON}$). Therein, $V_{OFF}$ is 6.9V and $V_{ON}$ is 9.1V. Although the normally closed characteristic is employed in the embodiment, the normally opened characteristic may be employed. Further, the liquid crystal having negative dielectric anisotropy may be used.

Figure 2:
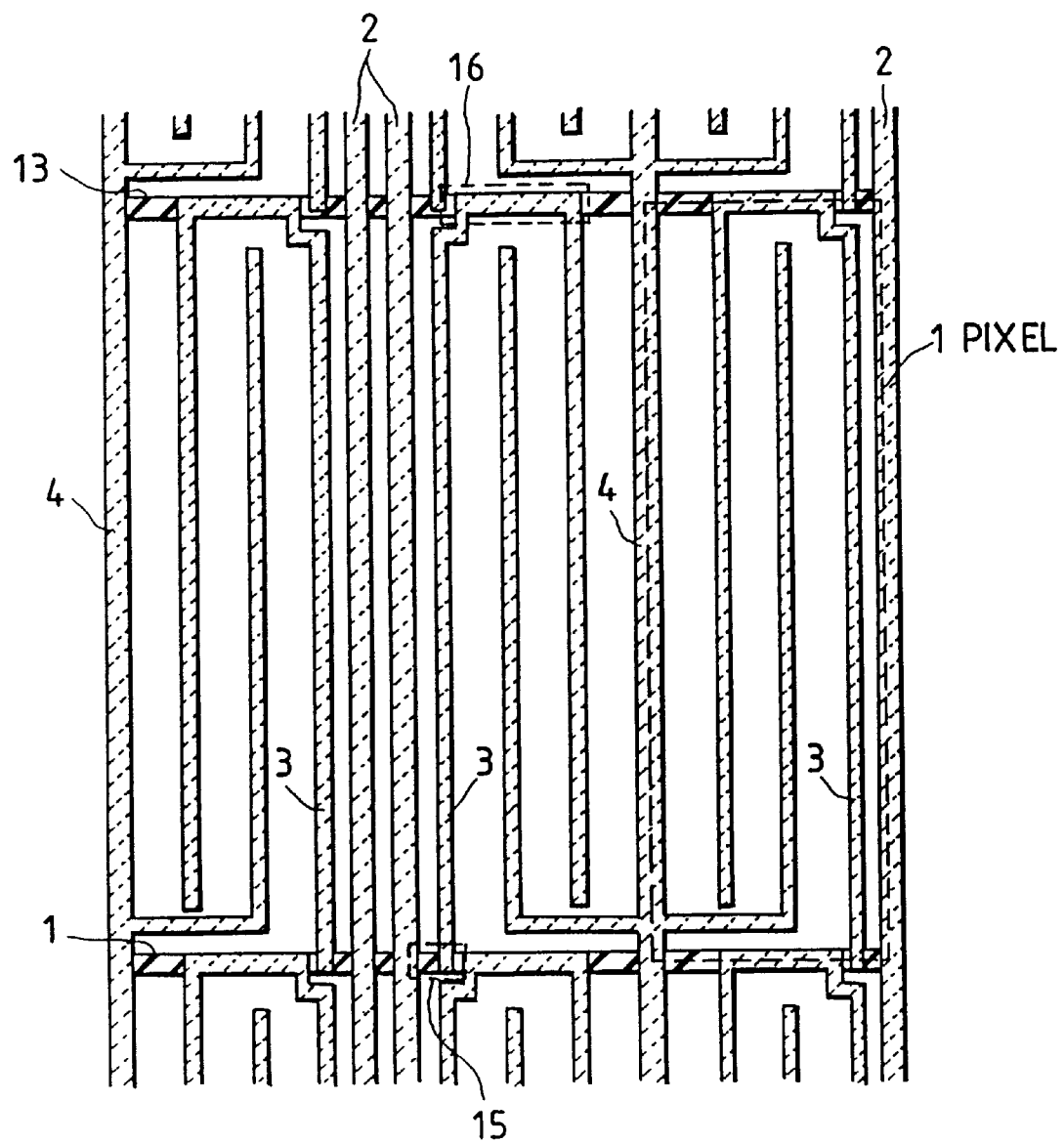
FIG. 2 is a front view showing the structure of a pixel in Embodiment 1 including the adjacent pixels.

FIG. 2 shows the plan configuration of various kinds of electrodes, interconnections and TFT's formed on the liquid crystal layer side of the lower substrate. The numeral 1 indicates scanning electrodes (gate electrodes) which extend in the lateral direction in the figure and are formed in plural number in parallel to each other. The numeral 2 indicates signal electrodes (drain electrodes) which extend in the vertical direction in the figure intersecting with the scanning electrodes and are formed in plural number in parallel to each other. Pairs of signal electrodes composed of the two adjacent signal electrodes are formed in plural number. A counter electrode 4 is formed between a pair of signal electrodes and the adjacent pair of signal electrodes. Each of the counter electrodes is composed of a trunk part extending in the vertical direction in the figure, and branch parts extending from the trunk part and bending toward right and left sides. As shown in the figure, one pixel is the region surrounded by a signal electrode 2, trunk part of a counter electrode 4 adjacent to the signal electrode, and two scanning electrodes adjacent to each other. A TFT 15 is formed on the scanning electrode in each of the pixels. The numeral 3 indicates a pixel electrode (source electrode) which extends in bending in an inverted U-shape from each of the TFT's. A part of the pixel electrode overlaps with the adjacent scanning electrode, and on the part a storage capacitance element 16 being formed.

In the embodiment, the pixel pitch is 110 $\mu$m in the direction of the scanning electrode, and 330 $\mu$m in the direction of the signal electrode. Concerning the width of electrodes, for the scanning electrode 1, of the signal electrode 2, of the trunk of the counter electrode 4 which are formed along plural pixels, a wide width of 10 $\mu$m is employed to avoid failure owing to breaking.

On the other hand, in order to improve opening ratio, for the pixel electrode 3 and the branch part extending from the trunk of the counter electrode 4, a narrow width of 6$\mu$m is employed. In addition to this, number of the counter electrode inyrtvonnrvyiond is decreased by a half by means of forming one counter electrode for two lateral alignments of pixels. Therewith, the opening part can be further expanded, and the probability of circuit short (proportional to the intersecting area of electrodes) in the intersecting part of the counter electrode 4 and the scanning electrode 1 is decreased. In the embodiment, the number of the signal electrodes is set in 640×3, the number of the scanning electrodes being set in 480, the number of the counter electrodes being set in 960 Then the number of the pixels becomes approximately one million.

Figure 3:
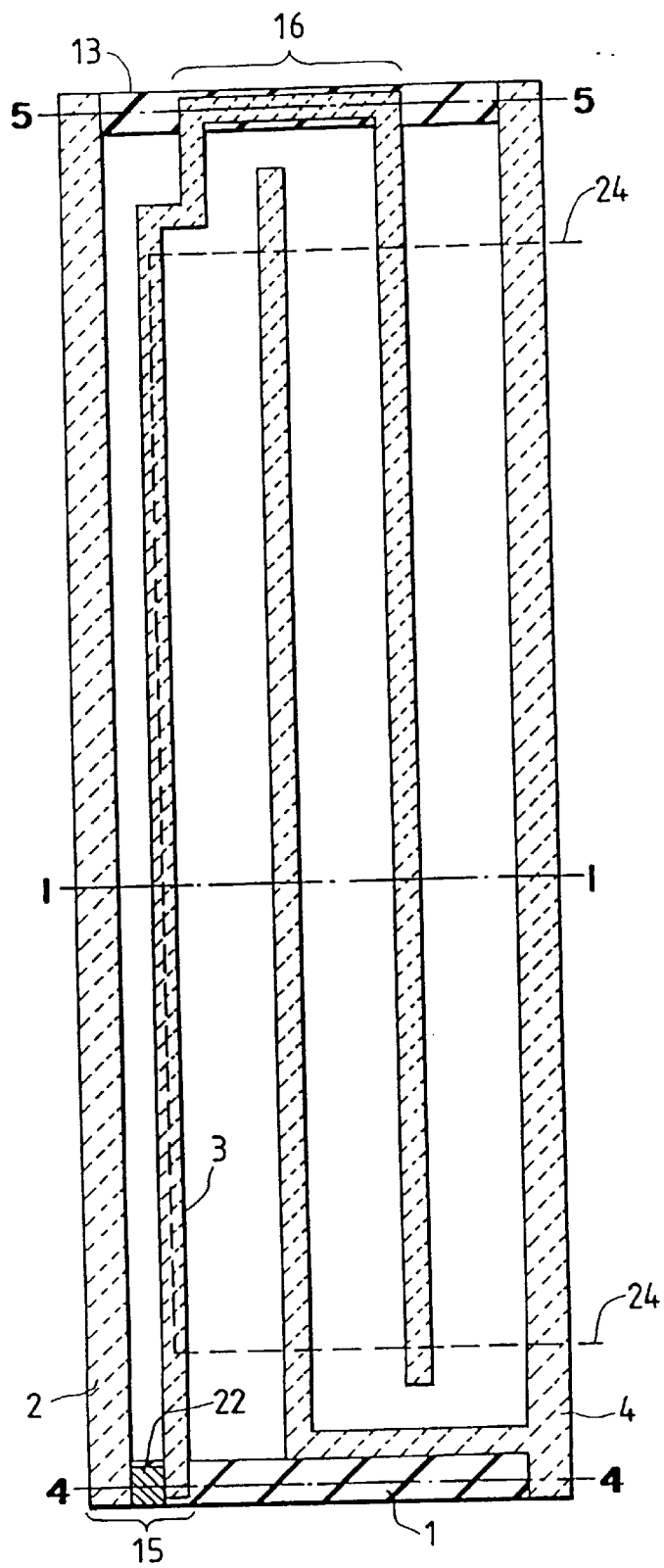
FIG. 3 is a front view showing the structure of a pixel in Embodiment 1 in accordance with the present invention.
Figure 4:
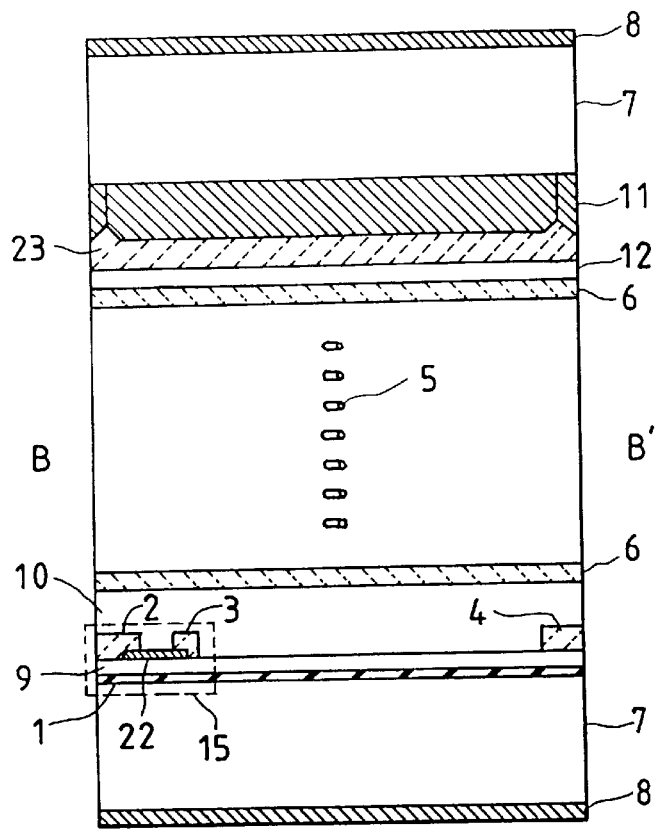
FIG. 4 is a cross-sectional side view taken along the line 4—4 in FIG. 3.
Figure 5:
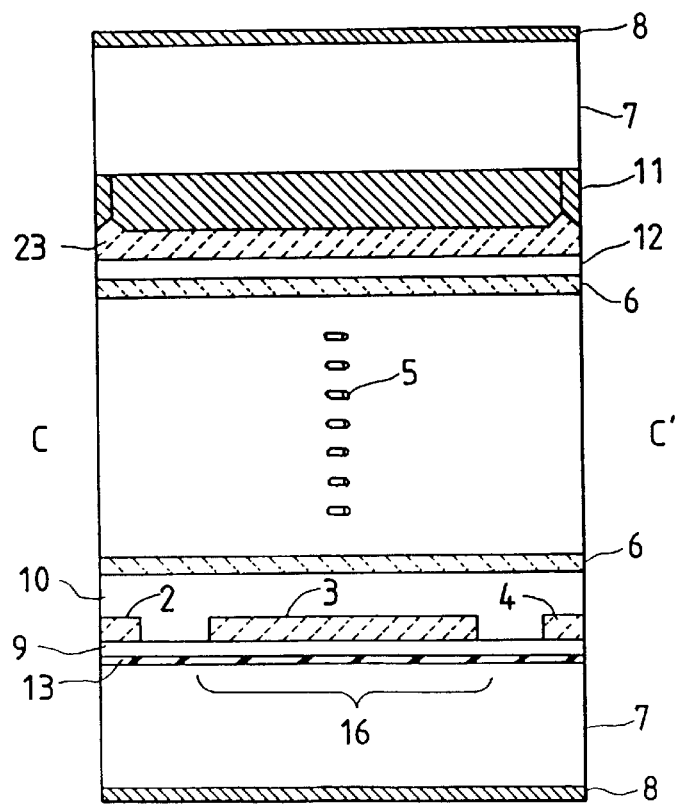
FIG. 5 is a cross-sectional side view taken along the line 5—5 in FIG. 3.

FIG. 3 is an enlarged view showing the part of one pixel in FIG. 2. FIG. 1 described above is a cross-sectional view being taken on the plane of the line 1—1 in FIG. 3. FIG. 4 and FIG. 5 are cross-sectional views being taken on the planes of the lines 4—4 and 5—5 in FIG. 3 respectively.

As shown in FIG. 4, the TFT has an inverted stagger structure, a gate insulator 9 (for example, silicon nitride) being formed on the scanning electrode 1, an amorphous silicon layer 22 being formed thereon. Further, a drain electrode 2 and a source electrode 3 are formed with connecting to the amorphous silicon layer. The drain electrode and the source electrode in the TFT are constructed with a part of the signal electrode and the pixel electrode respectively. Between the drain and the source electrodes and the amorphous silicon layer 22, an n+-type amorphous silicon layer is formed as an ohmic contact layer which is not shown in the figure. In the embodiment, the signal electrode 2, the pixel electrode 3 and the counter electrode 4 are made of the same metallic material (for example, aluminum).

As shown in FIG. 5, a gate insulator 9 is interposed between the scanning electrode 13 and the pixel electrode 3 to form a storage capacitance capacity element 16. The area of the storage capacitance in the embodiment is extremely smaller than that in a case of a conventional vertical electric field type, the capacitance is a small value of $C_S$=200 fF.

Although the storage capacitance in the embodiment is formed with the scanning electrode in the precedent row and the pixel electrode, the storage capacitance may be formed with the scanning electrode in the following row and the pixel electrode. And although the trunk portion of the counter electrode is commonly utilized with the two adjacent lateral alignments of pixels, it does not essentially change the effect of the present invention and is in the scope of the present invention if one trunk of the counter electrode is formed for each of the lateral alignment of the pixels.

Circuit diagram and driving waveform will be described below.

Figure 6:
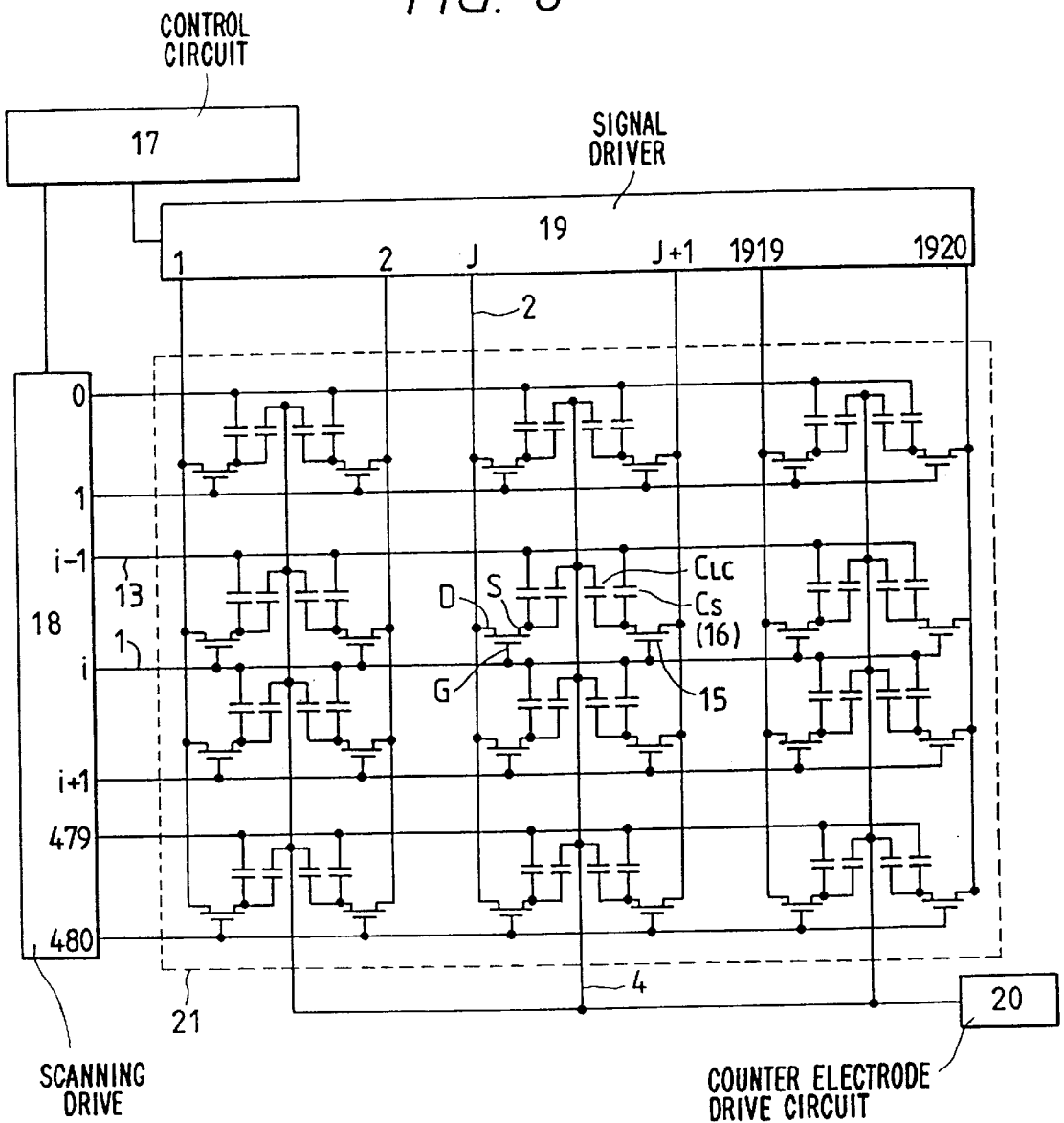
FIG. 6 is a view showing the construction of a display system in Embodiment 1 in accordance with the present invention.

FIG. 6 shows the circuit diagram of a liquid crystal display system in accordance with the present invention. The numeral 21 indicates a display region, a plurality of scanning electrodes 1 are formed in the lateral direction and a plurality of signal electrodes 2 and counter electrodes are formed in the vertical direction, a TFT is formed in each of the intersecting parts of the scanning electrode and the signal electrode. The gate electrode G of the TFT is connected to the scanning electrode, and the drain electrode is connected to the signal electrode. A liquid crystal capacitance $C_{LC}$ is formed between the source electrode S of the TFT and the counter electrode 4, a storage capacitance $C_S$ being formed between the source electrode S and the scanning electrode. The pixel electrode 3, the counter electrode 4 and the liquid crystal layer shown in FIG. 1 electrically form a capacitance $C_{LC}$. The storage capacitance $C_S$ is an absolutely essential capacitance for suppressing the feedthrough voltage entering into the voltage in the pixel electrode 3 through the capacitance $C_{GS}$ between the gate electrode and the source electrode of the TFT when the scanning signal voltage in the scanning electrode 1 is transferred from the selective voltage to the non-selective voltage, and is required to have a sufficiently large capacitance comparing to $C_{GS}$ (for example, approximately 10 times as large as $C_{GS}$).

The numeral 18 in FIG. 6 indicates a scanning driver which applies the scanning voltage for control the conduction state (ON) and the non-conduction state (OFF) of the TFT and the modulation voltage, which will be described later, to the scanning electrodes from the top to the bottom in the figure consecutively (the line-at-a-time method). The numeral 19 indicates a signal driver which supplies the image signal to be displayed to each of the signal electrodes. When the a selective-voltage (ON voltage) for TFT is applied to a scanning electrode, the TFT connected to the scanning electrode is brought into conduction state, the image signal supplied to the signal electrode is applied to the pixel electrode composing the liquid crystal capacitance $C_{LC}$ through the TFT. The numeral 17 indicates a control circuit for controlling operation of the scanning driver 18 and the signal driver 19, and the numeral 20 indicates a counter electrode drive circuit for supplying voltage to counter electrodes.

The present invention is characterized by employing a driver LSI capable of putting out at least three kinds of values to the scanning driver 18, or characterized by the scanning driver 18 capable of putting out at least three kinds of voltage values.

In the other hand, the signal driver 19 has the circuit capable of applying the voltage waveform having image information to the signal electrode 2, and is constructed such that the maximum amplitude $V_{DP-P}$ ($V_{DH}-V_{DL}$ in FIG. 7) in the signal voltage waveform becomes AV (refer to FIG. 33: $\Delta V=V_{ON}-V_{OFF}$). In the embodiment, a constant voltage is applied to the counter electrode.

Figure 7:
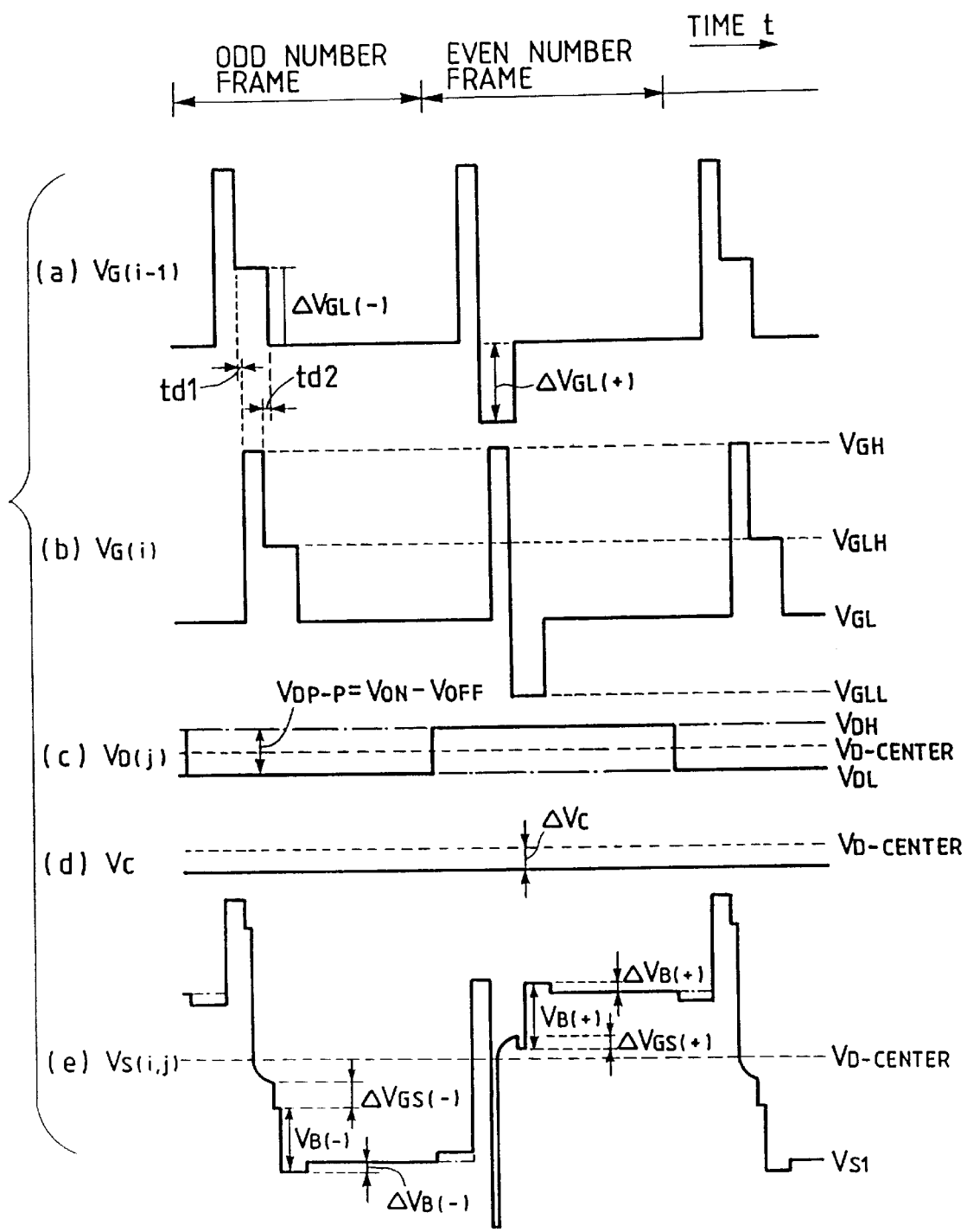
FIG. 7 is a chart showing the drive wave form in Embodiment 1 in accordance with the present invention.

FIG. 7 shows driving waveforms output from the drive circuit in the embodiment. FIG. 7 (a) shows the scanning signal waveform $V_{G(i-1)}$ applied to the i-th scanning electrode by the scanning driver 18, FIG. 7 (b) showing the scanning signal waveform $V_{G(i)}$ applied to the i-th scanning electrode by the scanning driver 18, FIG. 7 (c) showing the signal waveform $V_{D(j)}$ applied to the j-th signal electrode by the signal driver 19, FIG. 7 (d) showing the voltage waveform $V_C$ applied to the counter electrode. FIG. 7 (e) shows the voltage $V_S$ applied to the pixel electrode 3 of the pixel formed in the intersecting part of the i-th scanning electrode and the j-th signal electrode when the above voltages are applied to the scanning electrode, the signal electrode and the counter electrode. The signal waveform having image information is applied to the signal electrode 2, and the scanning signal waveform is applied to the scanning electrode 1 in synchronizing with the image signal waveform. The image signal voltage is transmitted to the pixel electrode 3 from the signal electrode 2 through the TFT 15, the voltage being applied to the liquid crystal part between the pixel electrode and the counter electrode 4. Therein, the non-selective voltage (OFF voltage) for the scanning signal waveform $V_G$ supplied to the scanning electrode 1 is modulated, the voltage in the pixel electrode 3 being changed by the capacitive coupling when the TFT 15 is in OFF-state, the bias voltages $V_{B(+)}$ and $V_{B(-)}$ are applied to the voltage in the pixel electrode 4. Therein, $V_{B(+)}$ shows the bias voltage for even number frames (positive frames) and $V_{B(-)}$ shows the bias voltage for odd number frames (negative frames). Therewith, the voltage of the voltage $V_S$ in the pixel electrode 3 subtracting the voltage $V_C$ in the counter electrode 4, that is, the voltage applied to the liquid crystal $V_{LC}=V_S-V_C$, is substantially increased comparing to the case where the OFF-voltage in the waveform $V_G$ supplied to the scanning electrode is not modulated (constant voltage). The amplitudes of the bias voltage $V_{B(+)}$ and VB(−) applied to the pixel electrode 3 for the variation $\Delta V_{GL}$ ($\Delta V_{GL(+)}=V_{GL}-V_{GLL}$ or $\Delta V_{GL(-)}=V_{GLH}-V_{GL}$) is expressed as follows.

$$V_B = (C_S/C_T)\Delta V_{GL}, \quad (1)$$

where $C_S$ is the capacitance of the storage capacitance element 16, $C_T$ is the total capacitance ($C_S+C_{LC}+C_{GS}+C_{DS}$). Therefore, by means of setting the amplitude of the bias Voltage $V_B$ for the normally closed in $$V_B = V_{OFF} + \Delta V/2, \quad (2)$$

and for the normally open in $$V_B = V_{ON} + \Delta V/2, \quad (3)$$

the voltage $\Delta V/2$ is supplied to the center voltage of drain voltage $V_{D\_CENTER}$ into the signal electrode 2 from the signal driver 19 when light state is obtained (in a case of even frame), and $-\Delta V/2$ when dark state is obtained (in a case of even frame). The maximum amplitude $V_{Dp-p}$ ($=V_{DH}-V_{DL}$) is decreased up to $\Delta V$ (FIG. 33). (In a case of odd frame, the voltage $-\Delta V/2$ is supplied to the center voltage when light state is obtained, and $\Delta V/2$ when dark state is obtained. The voltage for obtaining a middle halftone is in the same way as above.)

In the liquid crystal display element of the parallel electric field type in the embodiment, since a wire-shaped pixel electrode 3 and a wire-shaped counter electrode 4 are placed on an identical substrate in parallel to each other, the liquid crystal capacitance $C_{LC}$ is 33 fF, and is approximately one-tenth as small as that of approximately 370 fF in the conventional vertical electric field type where the liquid crystal capacitance is formed by facing the flat-shaped pixel electrode and the flat-shaped counter electrode to each other. Therefore, in a case where the driving method supplying the bias voltage into the pixel electrode from the scanning electrode is employed in the parallel electric field type, when the parasitic capacitance in the TFT (especially, the capacitance between the gate electrode and the source electrode $C_{GS}$) is set sufficiently small comparing to $C_S$, $C_T \approx C_S$. From Equation 1, the change in the non-selective voltage $\Delta V_{GL}$ itself becomes the bias voltage $V_B$, a sufficient bias voltage can be applied. In the embodiment, the preset values for the voltage waveforms in FIG. 7 are as follows; $V_{D-CENTER}$= 23.0V, $V_{GH}$=28.6V, $V_{GL}$=0, $V_{DH}$=24.5V, $V_{DL}$ 21.6V, $V_{GLH}$ 9.0V, $V_{GLL}$=−9.0V, $V_C$=22.3V. As the result, the voltage shift due to the parasitic capacitance $C_{GS}$ between the gate electrode and the source electrode $\Delta V_{GS(+)}$, $\Delta V_{GS(-)}$, $\Delta V_B$, the bias voltage $V_B$, the root-mean-square value $V_{rms}$ of the voltage $V_{LC}$ applying to liquid crystal are as shown in Table 1.

TABLE 1

Various Kinds of Voltage Values

| Display state | Light | Dark |
|---|---|---|
| $\Delta V_{GS(+)}$ | 0.44 | 0.59 |
| $\Delta V_{GS(-)}$ | 0.82 | 0.78 |
| $V_{B(+)}$ | 7.61 | 8.31 |
| $V_{B(-)}$ | 7.61 | 8.31 |
| $\Delta V_{B(-)}$ | 0.14 | 0.15 |
| $\Delta V_{B(+)}$ | 0.14 | 0.15 |
| $V_{rms}$ | 9.11 | 6.80 |

As shown in Table 1, the maximum voltage of the voltage $V_{LC}$ applying to liquid crystal is 9.11V which is equal to the voltage obtaining the light state $V_{ON}$, and the minimum voltage is 6.80V which is equal to the voltage obtaining the dark state $V_{OFF}$. It can be realized that the maximum value and the minimum value in the brightness curve in FIG. 33 is obtained, a sufficiently high contrast ratio of 80 being obtained. And further the maximum amplitude in the signal voltage waveform can be lowered up to $V_{DP-P}=V_{DH}-V_{DL}=$ 2.9V.

Therein, in such a scanning voltage waveform as that in the embodiment, the higher voltage between the selective voltage $V_{GH}$ and the non-selective voltage $V_{GLH}$ of the scanning signal voltage has to be set so as to satisfy the following equation.

$$V_{GH} \geq V_{DH} + V_{TH} + V_M \quad (4)$$

$$V_{GLH} \leq V_{SI} + V_{TH} - V_M. \quad (5)$$

Therein, $V_{S1}$ is the voltage indicated in FIG. 7 (e), $V_{S1}=V_{DL}-\Delta V_{GS(-)}-V_{B(-)}\cdot V_{TH}$ is the threshold value of the TFT, VM being the margin voltage to ensure the ON/OFF operation of the TFT. In the embodiment, the above voltages are set as $V_{TH}$=0V, $V_M$=4V. And in order to eliminate the direct current component, the counter electrode voltage $V_C$ is set lower than the center voltage $V_{D-CENTER}$ by $\Delta V_C$=0.5V.

Further, the scanning voltage $V_{G(i)}$ is started up to the ON voltage $V_{GH}$ with a time difference $t_{d1}$ after the timing of the transition of the scanning voltage $V_{G(i-1)}$ in the precedent row from the ON voltage $V_{GH}$ to the non-selective voltage $V_{GLH}$ or $V_{GLL}$, and is fallen to the non-selective voltage $V_{GLH}$ or $V_{GLL}$ for the scanning voltage $V_{G(i)}$ with a time difference $t_{d2}$ after the timing of the transition of the scanning voltage $V_{G(i-1)}$ in the precedent row from the ON voltage $V_{GH}$ to the non-selective voltage $V_{GLH}$ or $V_{GLL}$. this is because of taking the deformation in the voltage waveform into account, both the $t_{d1}$ and $t_{d2}$ in the embodiment are set 3µs. (However, in a case, as in the embodiment, where a storage capacitance 16 is connected to the scanning electrode in the precedent row and scanning is performed in the descending order of row, or where a storage capacitance 16 is connected to the scanning electrode in the following row and scanning is performed in the ascending order of row, the $t_{d1}$ and $t_{d2}$ are not always required. In a case where a storage capacitance 16 is connected to the scanning electrode in the precedent row and scanning is performed in the ascending order of row, or where a storage capacitance 16 is connected to the scanning electrode in the following row and scanning is performed in the descending order of row, the $t_{d1}$ and $t_{d2}$ are always required.)

In the embodiment as described above, although the liquid crystal capacitance is very small as 33 fF and the storage capacitance is small as 200 fF, the bias voltage of approximately 8V can be applied comparing to the modulating voltage of 9V ($\Delta V_G=V_{GLH}-V_{GL}=V_{GLLH}-V_{GL}$). Therewith, the display system can be driven by a very low drive voltage in which $V_{DP-P}$ (refer to FIG. 7 (c)) is only 2.9v. Therefore, the power dissipation in the signal driver 19, which requires electric power most, is decreased, which leads to decreasing in the total power dissipation of the display system. Further, since the chip size in the signal driver can be decreased, the frame region around display panel can be decreased, which leads to realizing small size display system. Furthermore, since the percentage occupied by the display area is increased, the performance in visibility can be improved. Concurrently, since the storage capacitance are small and consequently the opening area loss owing to the storage capacitance is small enough to get a high opening ratio of 53%, the brightness of the display screen can be improved.

The capacitance $C_G$ per one scanning bus line is expressed by the following equation.

$$C_G=M\cdot\{C_S(C_{GS}+C_{LC})+C_{GS}(C_S+C_{LC})\}/C_S+C_{GS}+C_{LC}), \quad (6)$$

where M is the total number of pixels in the horizontal direction. Since the liquid crystal capacitance in the vertical electric field type is large, $C_{GS}<<C_{LC}$.
Therefore, $$C_G=C_S\cdot C_{LC}/(C_S+C_{LC}). \quad (7)$$

Supposing the bias voltage having magnitude of 80% of the modulating voltage $\Delta V_{GL}$, $C_S=4C_{LC}$ is obtained and the minimum value of $C_G$ is (⅘)·$C_{LC}$. On the other hand, in the parallel electric field type, since $C_{GS}\approx C_{LC}<<C_S$, $$C_S=2C_{GS}+C_{LC} \quad (8)$$

When $C_{GS}=C_{LC}$, $C_{GS}=3C_{LC}$. As described above, since the liquid crystal capacitance ($C_{LC}$ in the parallel electric field type is approximately one-tenth as small as that in the vertical electric field type, $C_G$ in the parallel electric field type becomes approximately 0.4 times as small as $C_G$ in the parallel electric field type. Generally, the cross-talk (horizontal smear), in which horizontally drawn lines appear, takes place with change in the voltage waveform deformation due to different image. Especially, in the driving method where the voltage in the scanning electrode is modulated to decrease the amplitude of the signal voltage, the change in the voltage waveform deformation in the scanning electrode effectively changes the effective bias voltage. Therefore, by means of combining the driving method, where the voltage in the scanning electrode is modulated to decrease the amplitude of the signal voltage, with the parallel electric field type, the bias voltage can be sufficiently applied and the horizontal smear can be suppressed.

In the embodiment, the capacitance per one scanning electrode is a small value of 69 fF. Under this condition, the result of observing the scanning voltage waveform is that the waveform deformation in the modulating voltage hardly exists and the occurrence of horizontal smear cannot be confirmed visually. As described above, in the embodiment, the compatibility of low drive voltage, high opening ratio and high image quality can be attained. In addition to this, in the embodiment, since the difference between the voltage for displaying light state $V_{ON}$ and the voltage for displaying dark state $V_{OFF}$ is lower than 5V, the LSI having a absolute maximum supply voltage of lower than 5V fabricated with a process for general purpose LSI (for example C-MOS level) can be used in the signal driver 19, which leads to improving the productivity of display system and decreasing the manufacturing cost.

When the modulating voltage is not superposed, that is, $V_{GLH}=V_{GLL}=V_{GL}$, $V_{DP-P}=18.2V$ is obtained supposing $V_{DH}=22.5V$, $V_{DL}=4.3V$. Since $V_{DP-P}=2.9V$ in the embodiment, the $V_{DP-P}$ can be deceased below ⅙ as small as in the case of not superposing the modulating voltage.

[Embodiment 2]

In this embodiment, driving waveforms are different from that in Embodiment 1.

Figure 8:
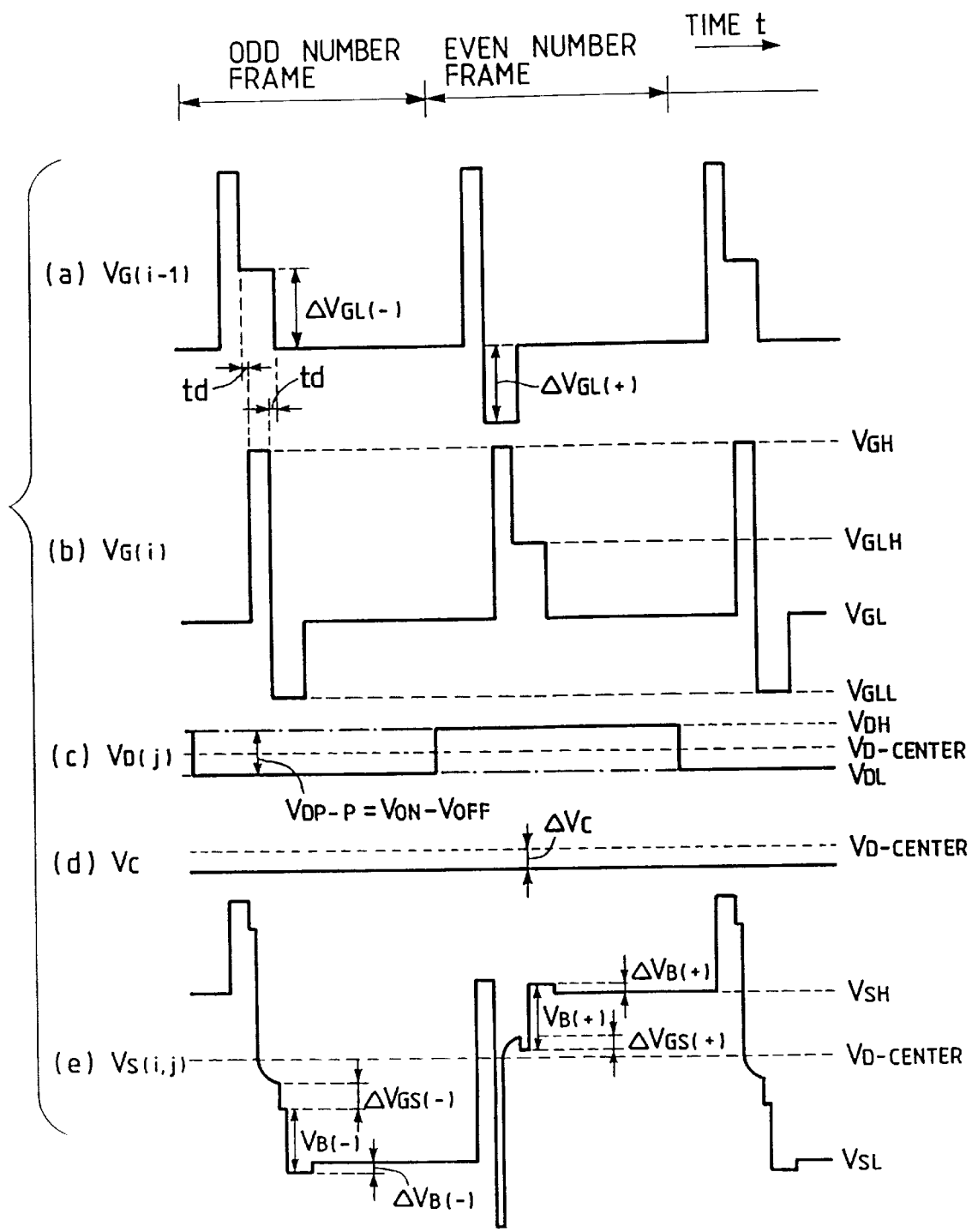
FIG. 8 is a chart showing the drive wave form in Embodiment 2 in accordance with the present invention.

FIG. 8 shows driving waveforms in the embodiment. Although the modulating voltage $\Delta V_{GL(+)}$, $\Delta V_{GL(-)}$ applied in an identical frame has the same polarity of positive or negative in the all scanning lines in Embodiment 1, in the embodiment the polarity of the modulating voltage is reversing between the adjacent scanning lines in each other. Therefore, the polarity of the voltage $V_S$ applied to the pixel electrode is reversed in alternate order by every row, which is so-called the gate line inversion driving method. In the embodiment, the equations corresponding to (Equation 4) and (Equation 5) for Embodiment 1 are given as follows.

$$V_{GH} \geq V_{DH} + V_{TH} + V_M \quad (9)$$

$$V_{GL} \leq V_{SI} + V_{TH} - V_M, \quad (10)$$

$$V_{GLH} \leq V_{S2} + V_{TH} - V_M, \quad (11)$$

where $V_{S2}$ is the voltage value shown in FIG. 8, and $V_{S2}=V_{DL}-\Delta V_{GS(+)}$. When the voltage is set as $V_M=4V$, the result is that $\Delta V_{D-CENTER}=15.0v$, $V_{GH}=20.5V$, $V_{GL}=0$, $V_{DH}=16.5V$, $V_{DL}=13.6V$, $V_{GLH}=9.0V$, $V_{GLL}=9.0V$, $V_C=14.5V$. And the voltage shift due to the parasitic capacitance $C_{GS}$ between the gate electrode and the source electrode $\Delta V_{GS(+)}$, $\Delta V_{GS(-)}$, $\Delta V_B$, the bias voltage $V_B$, the root-mean-square value $V_{rms}$ of the voltage $V_{LC}$ applying to liquid crystal are as shown in Table 2.

TABLE 2

| Display state | Various Kinds of Voltage Values | |
| --- | --- | --- |
| | Light | Dark |
| $\Delta V_{GS(+)}$ | 0.31 | 0.45 |
| $\Delta V_{GS(-)}$ | 0.69 | 0.64 |
| $V_{B(+)}$ | 7.61 | 8.31 |
| $V_{B(-)}$ | 7.61 | 8.31 |
| $\Delta V_{B(-)}$ | 0.14 | 0.15 |
| $\Delta V_{B(+)}$ | 0.14 | 0.15 |
| $V_{rms}$ | 9.11 | 6.80 |

By means of employing the gate line inversion driving method in the embodiment, the maximum amplitude in the voltage of the scanning electrode can be decreased from 28.6V to 20.5V although the margin voltage $V_M$ is set at the same value. Therewith, the absolute maximum supply voltage and power dissipation of the scanning driver IC 18 can be decreased.

As described above, in the embodiment, in addition to the same effects as in Embodiment 1, a scanning driver IC having a low absolute maximum supply voltage may be utilized and the power dissipation can be further decreased.

[Embodiment 3]

This embodiment is different from Embodiment 1 in the structure of electrodes and the method of driving.

Figure 9:
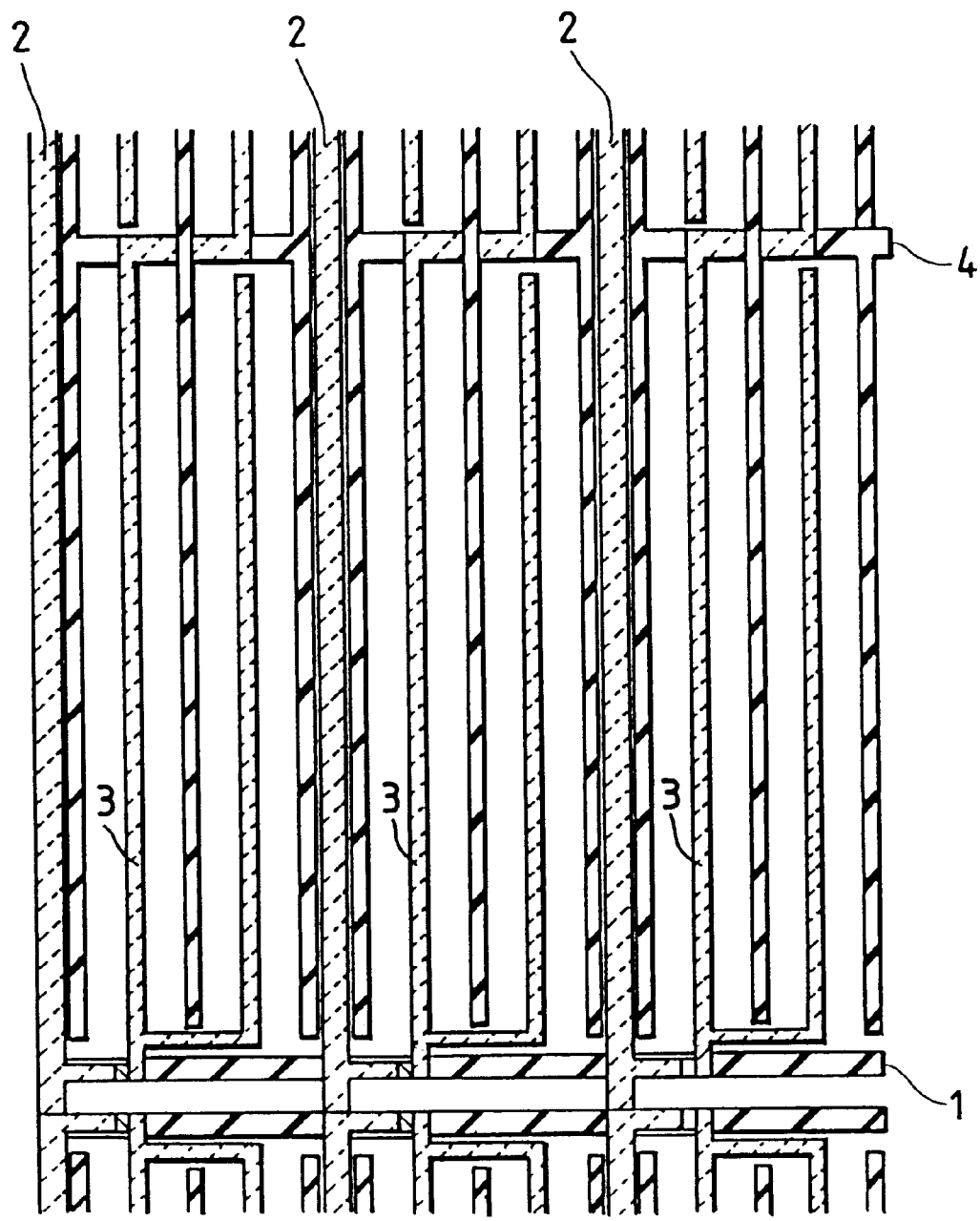
FIG. 9 is a front view showing the structure of a pixel in Embodiment 3 including the adjacent pixels.
Figure 10:
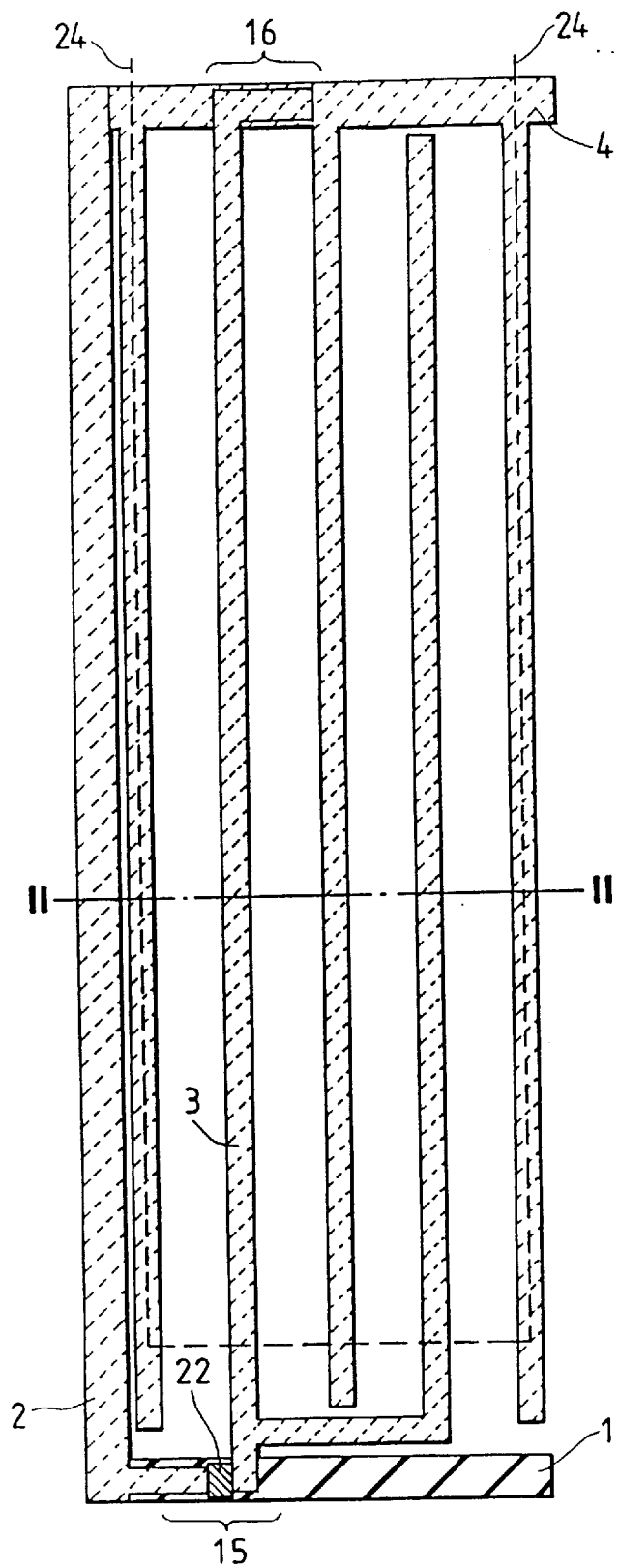
FIG. 10 is a front view showing the structure of a pixel in Embodiment 3 in accordance with the present invention.
Figure 11:
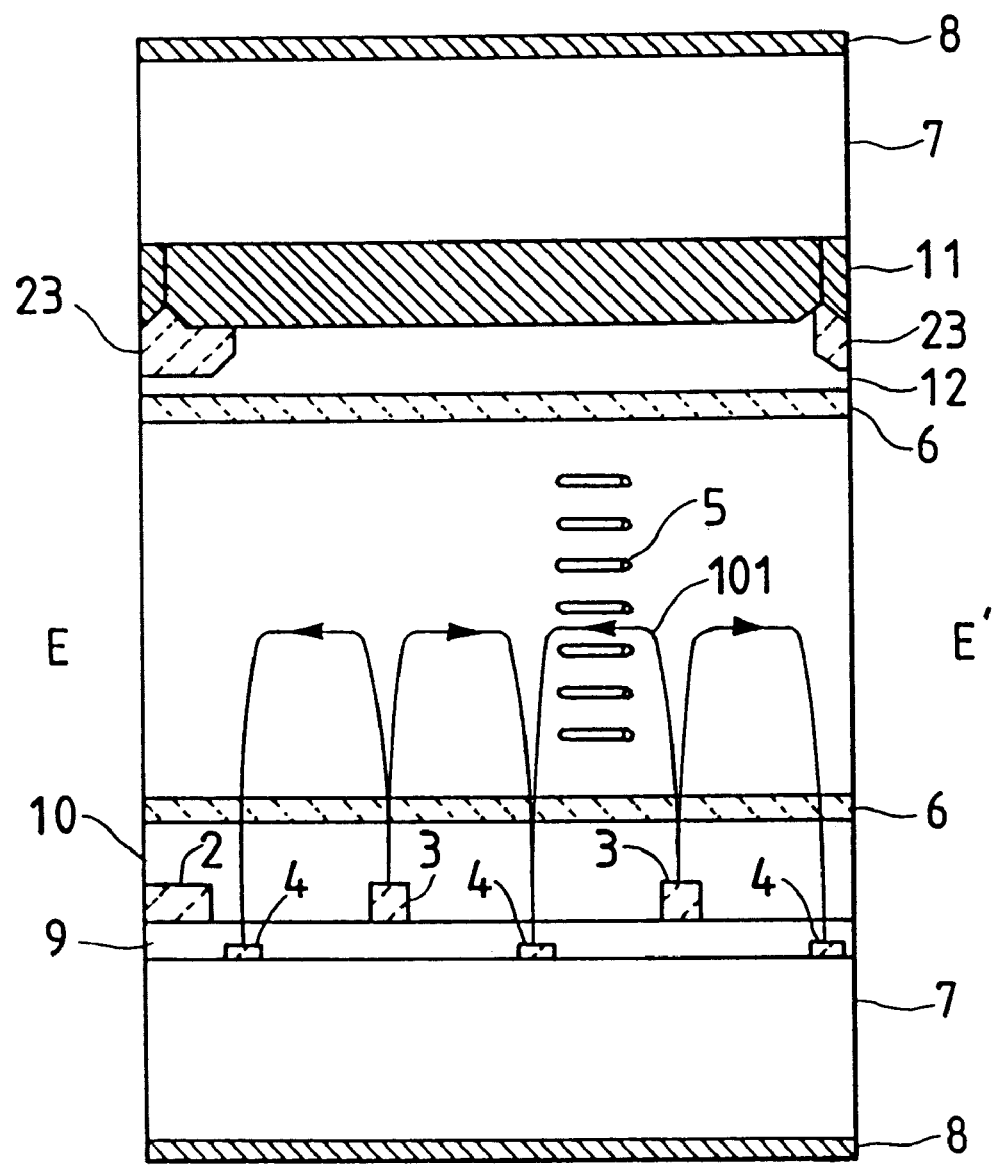
FIG. 11 is a cross-sectional side view being taken along the line 11—11 in FIG. 10.
Figure 12:
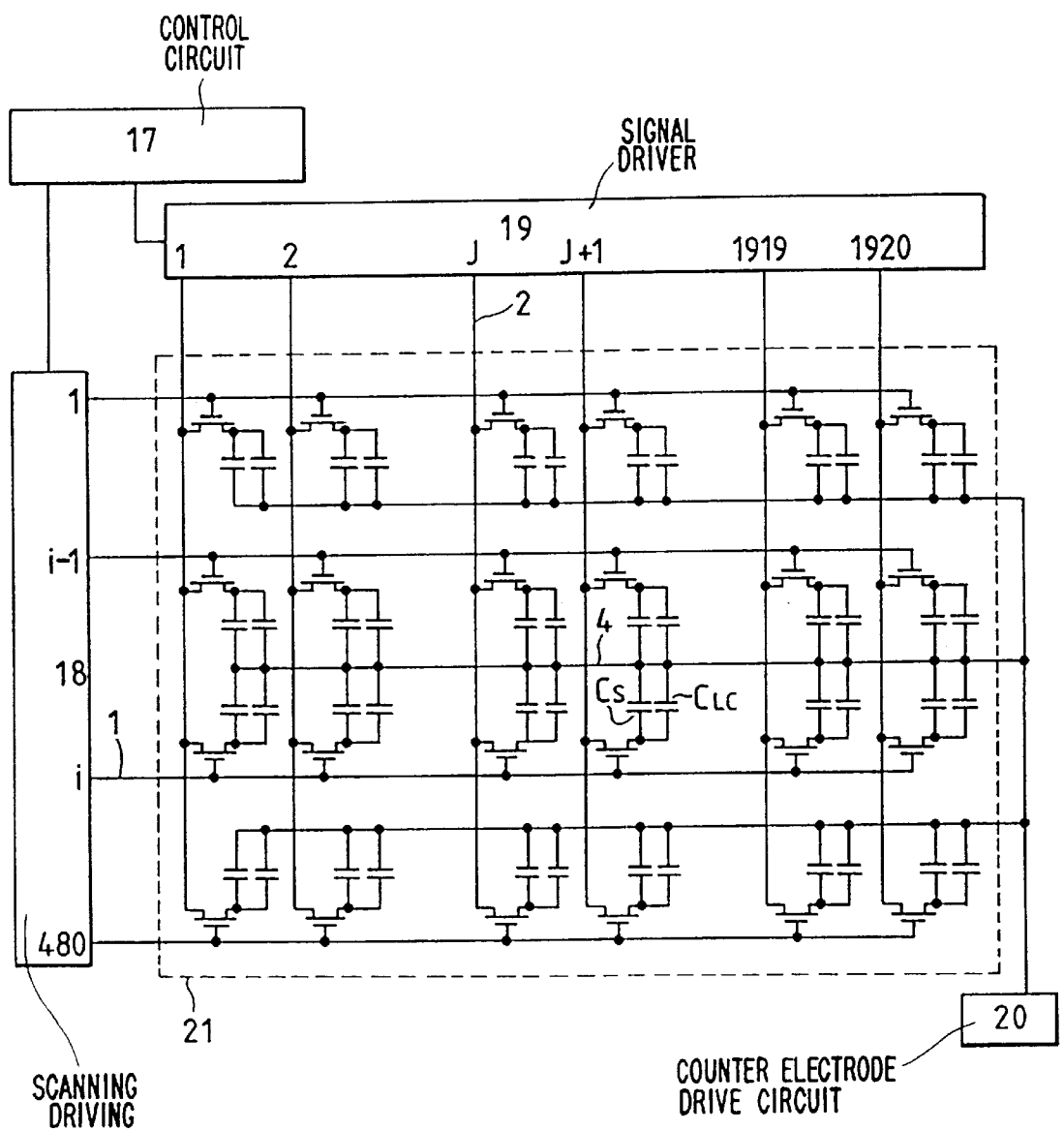
FIG. 12 is a view showing the construction of a display system in Embodiment 3 in accordance with the present invention.

FIG. 9 shows the plane structure of a region covering plural pixels on a lower substrate. FIG. 10 is an enlarged view showing a part of the pixel. FIG. 11 is a cross-sectional view being taken on the plane of the line 11—11 in FIG. 10. FIG. 12 shows the circuit diagram of a display system in accordance with the present invention.

As shown in FIG. 9 and FIG. 12, the trunks of the counter electrodes 4 are formed in parallel to the scanning electrode 1 and are led to the edge of the panel in the opposite side of the scanning driver 18, the trunks are connected together to connect to the counter driver 20. The branches are extended upward and downward from each of the trunks of the counter electrodes. In order to realize a high opening ratio as high as possible, one trunk of the counter electrode is formed for two vertically adjacent alignment of the pixels to decrease the number of the counter electrode interconnections to a half. The scanning electrode 1 and the counter electrode 4 are formed by using the same metallic material.

As shown in FIG. 11, a storage capacitance 16 is formed by sandwiching a gate insulator 9 with the pixel electrode and the counter electrode 9. Since the counter electrode 4 is formed on another layer different from the pixel electrode 3 and the signal electrode 2 through the gate insulator 9, the short circuit between the counter electrode 4 and the signal electrode 2 is hardly occurred and the distance between the both can be made as short as approximately 3 μm. Therewith, since the area of the region not serving display between the signal electrode 2 and the adjacent counter electrode can be decreased, a high opening ratio equal to Embodiment 1 can be kept although the gap width between the electrodes is decreased comparing to Embodiment 1 by dividing the pixel into four parts (in Embodiment 1, dividing it into three parts) with the pixel electrode 3 and the branch portion of the counter electrode 4. By decreasing the gap between the electrodes, the voltage applied between the electrodes can be decreased to apply the same magnitude of the electric field to the liquid crystal. As described above, in the embodiment, the drive voltage can be decreased comparing to Embodiment 1 with keeping the same brightness as that in Embodiment 1.

Since the most part of the electric field from the signal electrode 2 terminates at the counter electrode 4 by forming the counter electrode 4 immediately adjacent to the signal electrode 2, the capacitive coupling between the signal electrode 2 and the pixel electrode 3 can be prevented with shielding effect of the counter electrode, and the voltage fluctuation in the pixel electrode due to the voltage fluctuation in the signal electrode can be suppressed. Therewith, the cross-talk in the vertical direction (vertical smear) can be suppressed, which improves the display quality. In the embodiment, the number of the signal electrodes is 640×3, the number of the scanning electrodes being 480, the number of the counter electrode interconnection being 240, the total number of the pixels being approximately one million equal to that in Embodiment 1. Since the number of the counter electrode interconnections in the embodiment can be substantially decreased comparing to Embodiment 1, the probability of owing to break in interconnection and the probability of failure short circuit between interconnections are drastically decreased and the production yield of the panel can be improved. Although the trunk portion of the counter electrode in the embodiment is commonly used for the two vertically adjacent alignment of pixels, it does not essentially change the effect of the present invention and is in the scope of the present invention if one trunk of the counter electrode is formed for each of the vertical alignment of the pixels.

Figure 13:
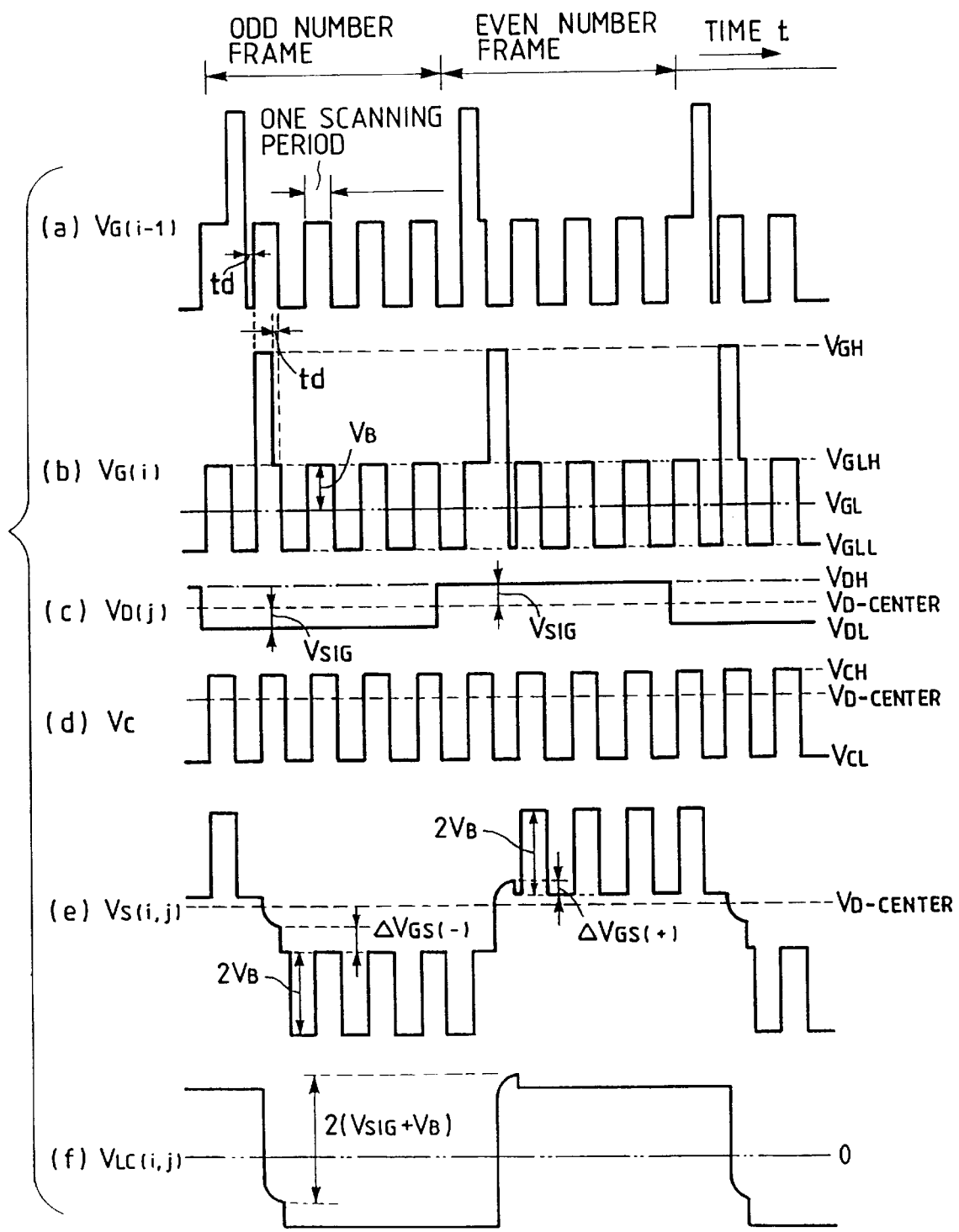
FIG. 13 is a chart showing the drive wave form in Embodiment 3 in accordance with the present invention.

FIG. 13 shows the driving waveform in the display system in the embodiment. The non-selective voltage of the scanning signal $V_{G(i-1)}$, $V_{G(i)}$ is changed in alternate order every scanning cycle between $V_{GLH}$ and $V_{GLL}$, and in synchronizing with this the voltage $V_C$ in the counter electrode 4 is also changed between $V_{CH}$ and $V_{CL}$. Therein, the amplitude of the OFF voltage $|V_{GLH}-V_{GLL}|$ and the amplitude of the counter electrode voltage $|V_{CH}-V_{CL}|$ are set in the same value so that the relationship in the relative voltages among the pixel electrode 3, the scanning electrodes 1 and 13, the counter electrode 4 becomes constant. By means of modulating the voltage $V_C$ in the counter electrode at the same time, the modulation phase in the non-selective voltage of the scanning signal can be brought to the same phase in all of the rows. Therewith, although the output of the scanning driver IC in Embodiment 1 needs four kinds of voltage values, in the embodiment the circuit size inside the scanning driver IC can be decreased since the display system can be driven with three kinds of voltage value. Further, if the modulating voltage is applied to the ground voltage in the scanning driver IC or the OFF voltage through output is used for the scanning side drive IC, the scanning side drive IC having binary output can be utilized and the display system can be made further small.

As described above, in the embodiment, in addition to the same effects as in Embodiment 1, the drive voltage can be further decreased and the occurrence of cross-talk can be suppressed. And the production yield of panel can be improved. Further, since the scanning side drive IC can be made small, the whole size of the display system can be made small.

Since the diving method in the embodiment can be applied to the pixel structure in Embodiment 1, the scanning side drive IC in Embodiment 1 can be also made small.

Although in the embodiment the modulating voltage is changed in alternate order by every one scanning cycle, it is possible to attain the same effect if the modulating voltage is changed in alternate order by every two scanning cycles or by every one frame cycle.

[Embodiment 4]

Figure 14:
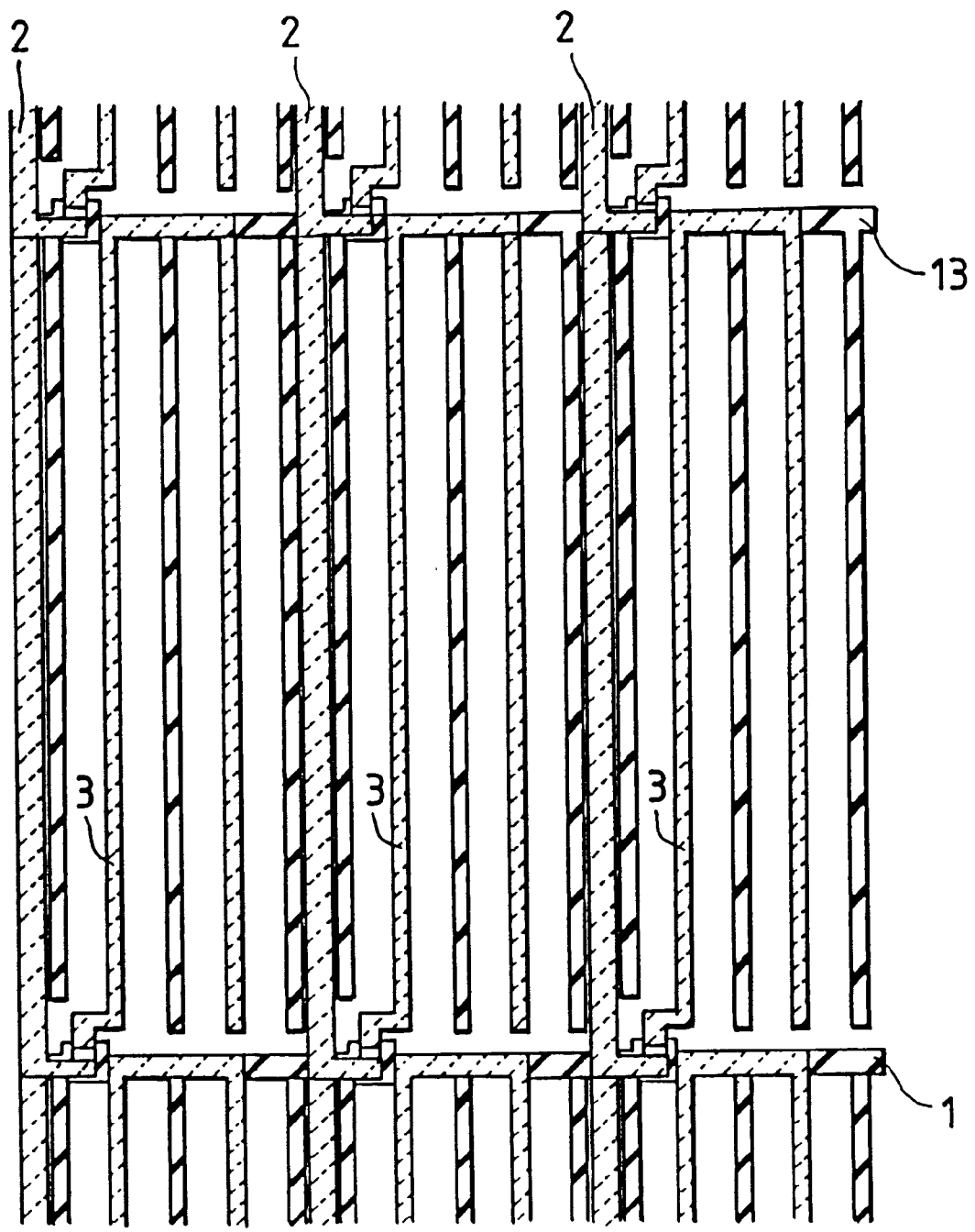
FIG. 14 is a front view showing the structure of a pixel in Embodiment 4 including the adjacent pixels.
Figure 15:
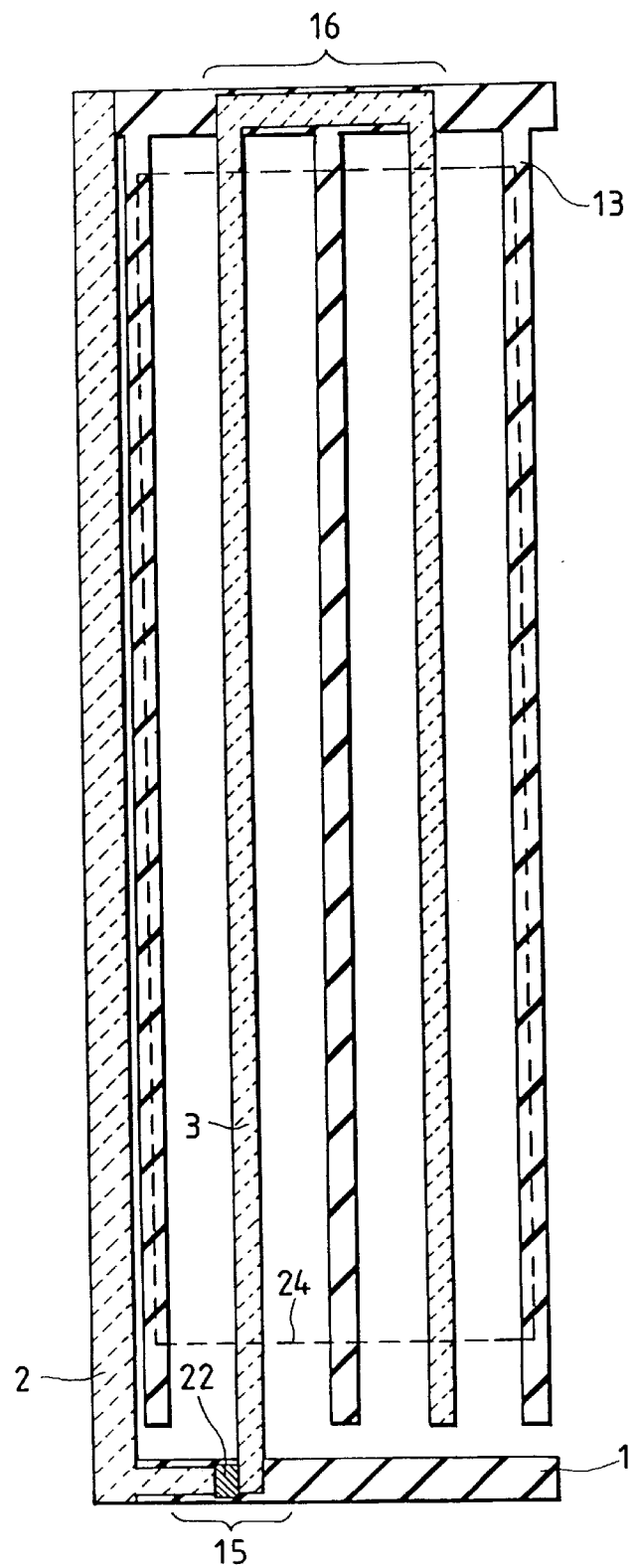
FIG. 15 is a front view showing the structure of a pixel in Embodiment 4 in accordance with the present invention.

FIG. 14 shows the structure of a region covering plural pixels in a liquid crystal display system in the embodiment. FIG. 15 is an enlarged view showing a part of the pixel.

In the embodiment, the counter electrode 4 is not provided, and the scanning electrode 13 in the precedent row is utilized as a counter electrode facing against the pixel electrode 3. The orientation of liquid crystal molecules in the liquid crystal layer is mainly controlled by the electric field E between the pixel electrode 3 and the branch electrode extended from and perpendicular to the scanning electrode 13 in the precedent row. Although in the embodiment the branch electrode is led from the scanning electrode in the precedent row, the branch electrode may be led from the scanning electrode in the following row. The storage capacitance 16 is formed in the structure by sandwiching the gate insulator 9 with the pixel electrode 3 and the scanning electrode 13 in the precedent row. Since the scanning electrode 13 in the precedent row is placed on another layer different from the signal electrode 2 through the insulator, the distance between the scanning electrode 5 and the signal electrode 2 can be decreased to 3 µm. Further, since the counter electrode is not provided, the region occupied by the counter electrode wiring portion in the foregoing embodiments can be utilized for the opening portion. As described above, since the area of the region incapable of controlling light transmitting state is decreased, a high opening ratio exceeding those in Embodiment 1 and Embodiment 3 can be obtained although the gap between the electrodes is decreased by dividing the pixel into four parts. Therefore, in the embodiment, the brightness is further improved, the drive voltage being decreased comparing to Embodiment 1. By means of forming the branch electrode of the scanning electrode 13 in the precedent row adjacent to the signal electrode 2, most of the electric field from the signal electrode 2 terminates at the branch electrode of the scanning electrode 13. Therefore, the voltage fluctuation in the pixel electrode due to the voltage fluctuation in the signal electrode can be suppressed, and the cross-talk in the vertical direction can be suppressed.

Figure 16:
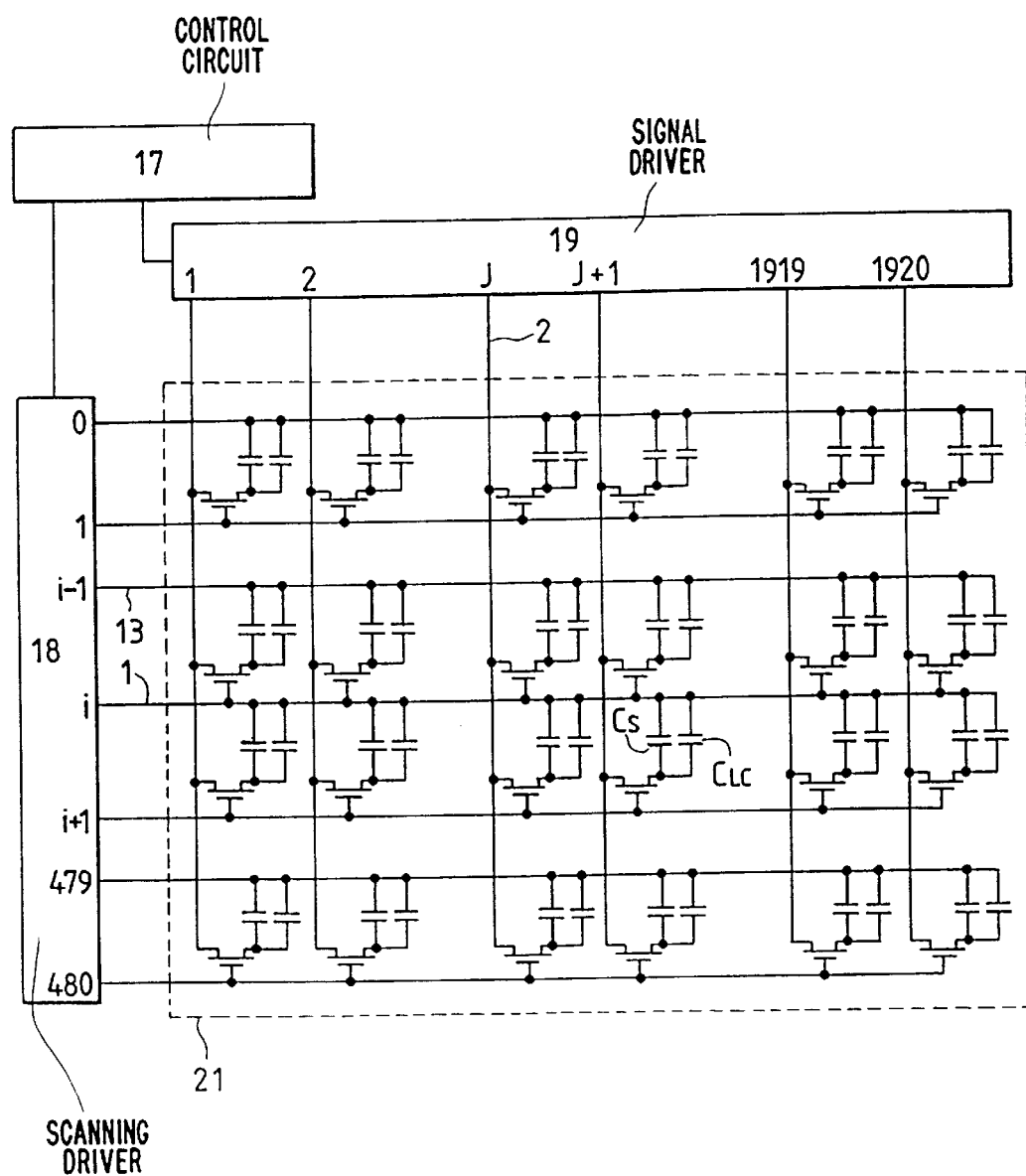
FIG. 16 is a view showing the construction of a display system in Embodiment 4 in accordance with the present invention.

FIG. 16 shows the circuit diagram of the display system in the embodiment. Since the counter electrode is not provided, the counter driver is not necessary. Since the counter electrode wiring and the counter driver can be eliminated, the productivity of the panel can be improved.

Figure 17:
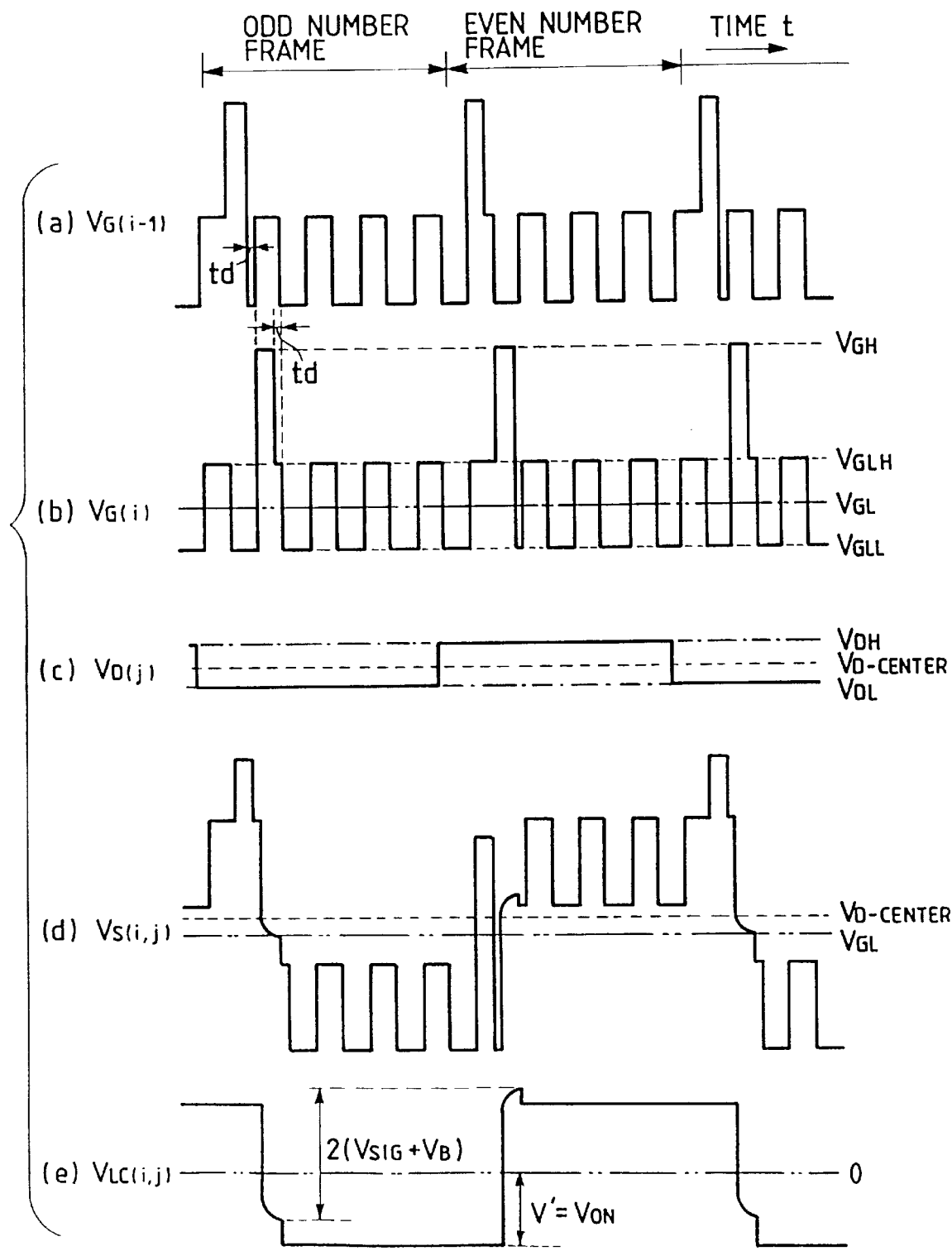
FIG. 17 is a chart showing the drive wave form in Embodiment 4 in accordance with the present invention.

FIG. 17 shows the drive waveform in the embodiment. (a) and (b) show the scanning signal voltage, (c) showing the signal voltage, (d) showing the voltage applied to the pixel electrode, (e) showing the voltage difference between the pixel electrode and the scanning electrode. In the embodiment, the scanning signal is the same as in Embodiment 3. Since the modulating voltage in the scanning signal voltage applied to the scanning electrode 1 and the modulating voltage in the scanning signal voltage applied to the scanning electrode 13 in the precedent row are the same waveform, the displacement of the phase in the modulating voltage waveform due to the difference in the voltage waveforms in the counter electrode and scanning electrode is eliminated, the bias voltage can serve as the voltage applied to the liquid crystal with high-fidelity.

Putting the maximum gate voltage applied during non-selective period as V', V'=$V_{ON}$ as shown in FIG. 17. In the embodiment, since the alternating current waveform is applied to the voltage applied to liquid crystal, the threshold voltage $V_{TH}$ of the TFT is controlled such as to satisfy $V_{TH}$>$V_{ON}$. Therewith, the pixel electrode can operate to keep the voltage even when the voltage applied to liquid crystal (-$V_{ON}$) having a negative value based on the non-selective voltage of the scanning signal is charged. In the embodiment, the gate threshold voltage $V_{TH}$ is controlled with shifting toward high voltage side by means of make the amorphous silicon film thickness thin. The gate threshold voltage $V_{TH}$ is with in the range of $V_{TH}$<$V_G$<$V_D$+$V_{TH}$, and the gate threshold voltage is defined by the gate voltage $V_G$ at the intersecting point of the gate voltage $V_G$ axis and a straight line which is obtained by plotting the root of drain currents $\sqrt{I_D}$ against the gate voltage $V_G$ and approximating the plots by a straight line. Although in the embodiment the gate threshold voltage is controlled by thinning the semiconductor film, there are other methods for controlling the gate threshold voltage by utilizing selection of material such as gate electrode material, gate insulator, semiconductor film; doping; back channel control and so on. Any one of the above method or combination of the above may be employed, and these are within the scone of the present invention as far as it satisfies the condition on the gate threshold voltage.

As described above, in addition to the effects in Embodiments 1 and 3, the embodiment has the effects in that the brightness is further improved, the mass productivity of panel being improved.

Especially, by means of making $V_{TH}$ exceed $V_{ON}$, it becomes possible to charge and keep the voltage being negative based on the non-selective voltage of the scanning signal, and consequently the liquid crystal can be driven with alternating current. Therefore, it is realized to obtain an active matrix type liquid crystal display system having a long useful service life and a high image quality without occurrence of after-image.

The drive methods in Embodiments 1 and 2 may be applied to the pixel structure in the embodiment.

[Embodiment 5]

This embodiment is different from Embodiment 4 in drive method.

Figure 18:
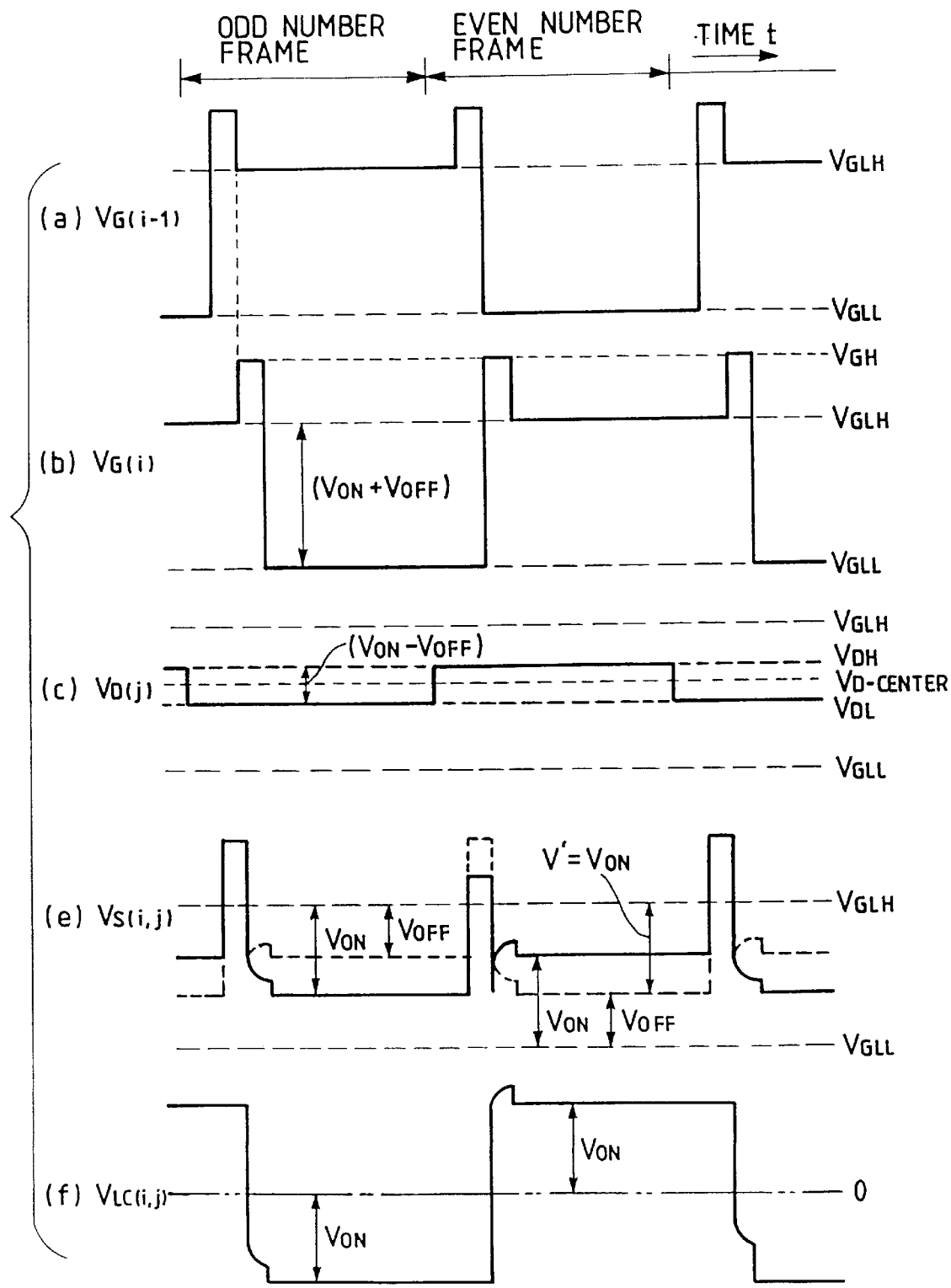
FIG. 18 is a chart showing the drive wave form in Embodiment 5 in accordance with the present invention.

FIG. 18 shows the drive waveform un the embodiment. In the embodiment, the scanning electrode receives the scanning signal voltage in which the non-selective voltage in the same frame is constant but the non-selective voltage value is changed every frame, and the phase difference by row is {1+(one scanning cycle)/(one frame cycle)}. The image signal voltage $V_D$ is applied to the pixel electrode during selective period through the TFT be means of applying the voltage to the signal electrode in such a manner that the negative voltage is applied to the signal electrode 2 when the non-selective voltage applied to the scanning electrode 13 in the precedent row is $V_{GLH}$ which is the higher voltage between the two non-selective voltages $V_{GLH}$, $V_{GLL}$, and a positive voltage is applied to the signal electrode 2 when the non-selective voltage applied to the scanning electrode 13 in the precedent row is $V_{GLL}$ which is the lower voltage between the two non-selective voltages $V_{GLH}$, $V_{GLL}$. Therewith, the alternating current drive waveform can be applied to the liquid crystal.

In the embodiment, since $V'=V_{ON}$ as shown in FIG. 18, the threshold voltage of the TFT to satisfy $V_{TH} > V_{ON}$ is required. It is realized that the polarity can be reversed every row with low electric power consumption without changing the non-selective voltage every scanning cycle as in Embodiment 4, and the flickering can be suppressed. In the embodiment, by means of putting the difference $V_{GLH} - V_{GLL}$ between the higher voltage of the non-selective voltage $V_{GLH}$ and the lower voltage of the non-selective voltage $V_{GLL}$ equal to $V_{ON}+V_{OFF}$, the maximum amplitude in the image signal voltage $V_{pp-p}$ can be limited to $V_{ON}-V_{OFF}$ and a low threshold voltage equivalent to Embodiment 4 can be realized.

As described above, in the embodiment, the electric power consumption of the scanning driver can be decreased comparing to Embodiment 4.

[Embodiment 6]

Figure 19:
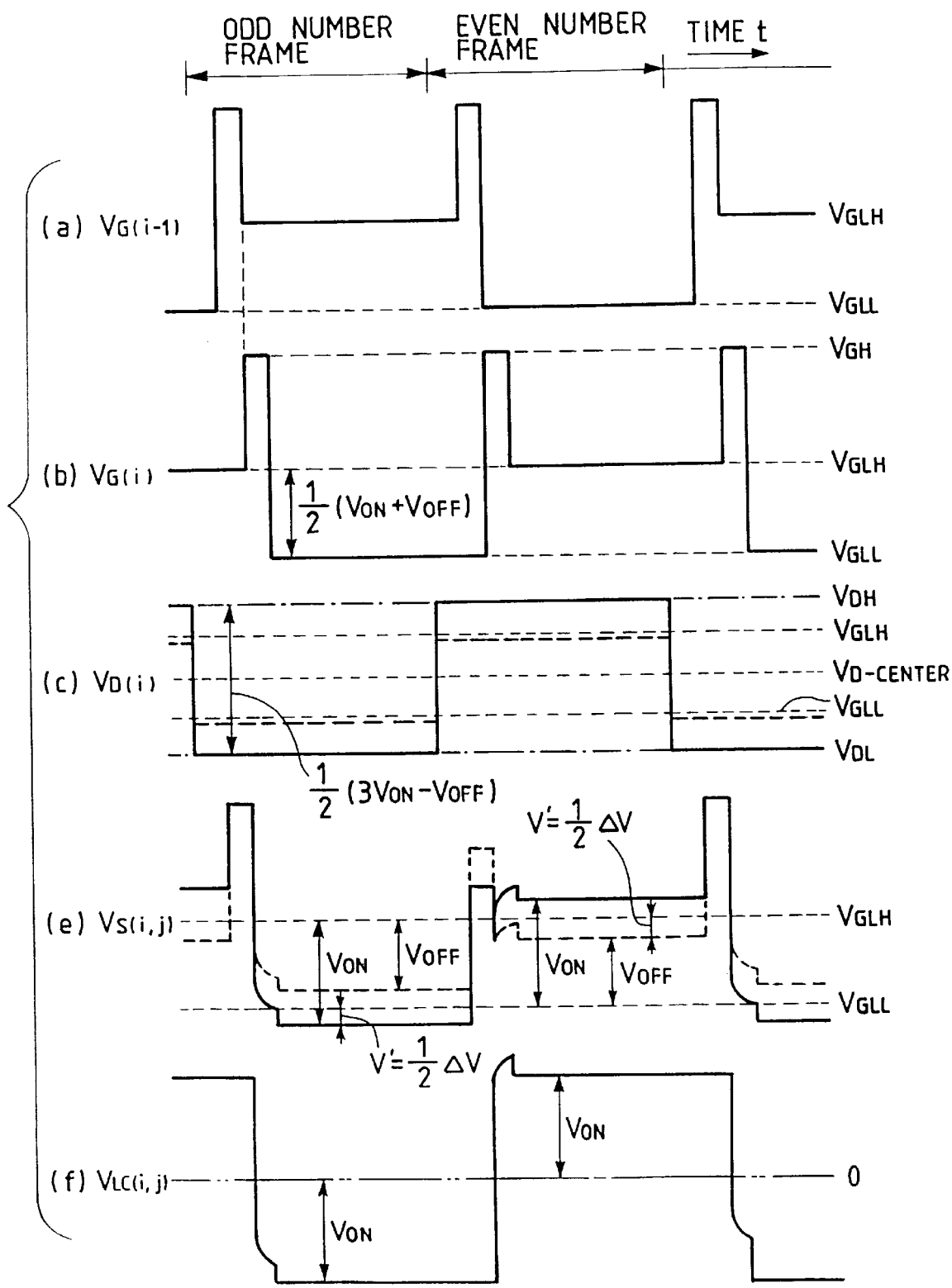
FIG. 19 is a chart showing the drive wave form in Embodiment 6 in accordance with the present invention.

FIG. 19 shows the drive waveform in the liquid crystal display system in this embodiment. Although the drive waveform in the embodiment is basically the same as that in Embodiment 5, the different point from Embodiment 5 is in that the difference $V_{GLH} - V_{GLL}$ between the higher voltage of the non-selective voltage $V_{GLH}$ and the lower voltage of the non-selective voltage $V_{GLL}$ is put equal to $(V_{ON}+V_{OFF})/2$. Therewith, as shown in FIG. 19 (c), although the maximum amplitude in the image signal voltage $V_{pp-p}$ becomes a higher voltage of $(3V_{ON} - V_{OFF})/2$, the threshold voltage of the TFT $V_{TH}$ becomes larger than $V'=\Delta V/2=(V_{ON} - V_{OFF})/2$ and consequently the maximum negative voltage $(-V_{ON})$ can be applied to the liquid crystal. Therewith, the TFT having a lower threshold voltage comparing to Embodiments 4 and 5 can be utilized, and the maximum amplitude of the image signal voltage can be lowered by $(V_{ON}+V_{OFF})/2$ comparing to the maximum amplitude of $V_{DP-P}=2V_{ON}$ in the case of single-value non-selective voltage. Further, in the embodiment, the value $(V_{ON} - V_{OFF})$ can be made smaller by means of making the angle $\phi_{LC}$ larger, and the TFT having a further low threshold voltage can be utilized and concurrently the image signal voltage can be lowered.

As described above, in the embodiment, there is an effect in that the TFT having lower threshold voltage can be utilized comparing to Embodiments 4 and 5.

[Embodiment 7]

Figure 20:
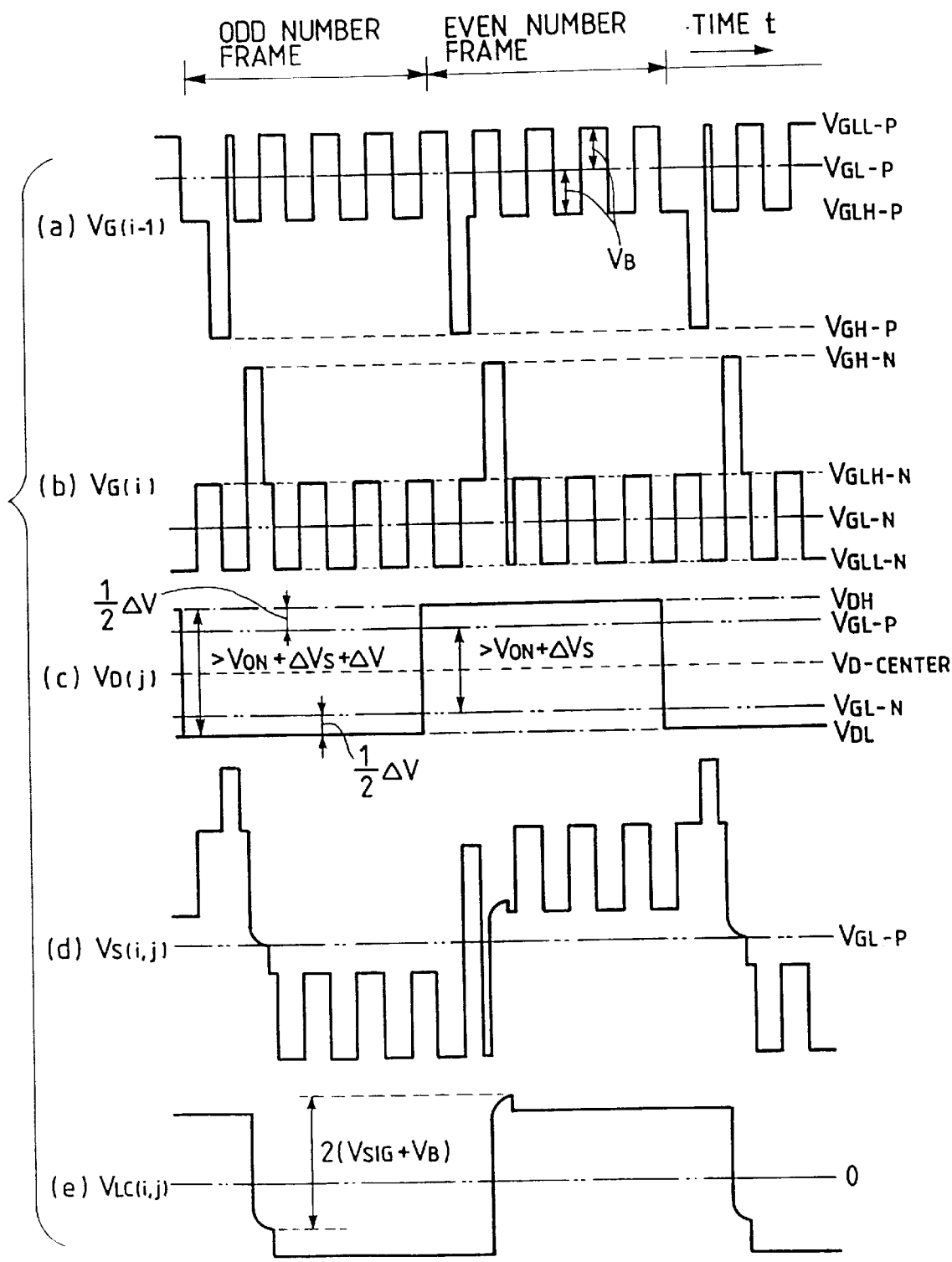
FIG. 20 is a chart showing the drive wave form in Embodiment 7 in accordance with the present invention.

FIG. 20 shows the driving waveform in the liquid crystal display system in this embodiment. In the embodiment, p-type TFT's and n-type TFT's are alternatively placed by row. Therewith, the TFT having a negative threshold voltage $V_{TH}$ can be used. For using the TFT having a negative threshold voltage $V_{TH}$, it is necessary that the center value $V_{GL-P}$ of the non-selective voltage in the scanning electrode having the p-type TFT is higher than the center value $V_{GL-N}$ of the non-selective voltage in the scanning electrode having the n-type TFT, and at the same time the voltage difference exceeds $\Delta V_{ON}+\Delta V_S$. There, $\Delta V_S$ is the maximum value of feedthrough voltage. Therewith, the maximum amplitude $V_{DP-P}$ of the image signal voltage can be decreased up to $V_{ON}+\Delta V_S-\Delta V$.

As described above, in the embodiment comparing to Embodiment 4, the TFT having a negative threshold voltage $V_{TH}$ can be used and the image signal voltage can be lowered.

[Embodiment 8]

This embodiment is different from Embodiment 1 in the structure of pixel and the driving method.

Figure 21:
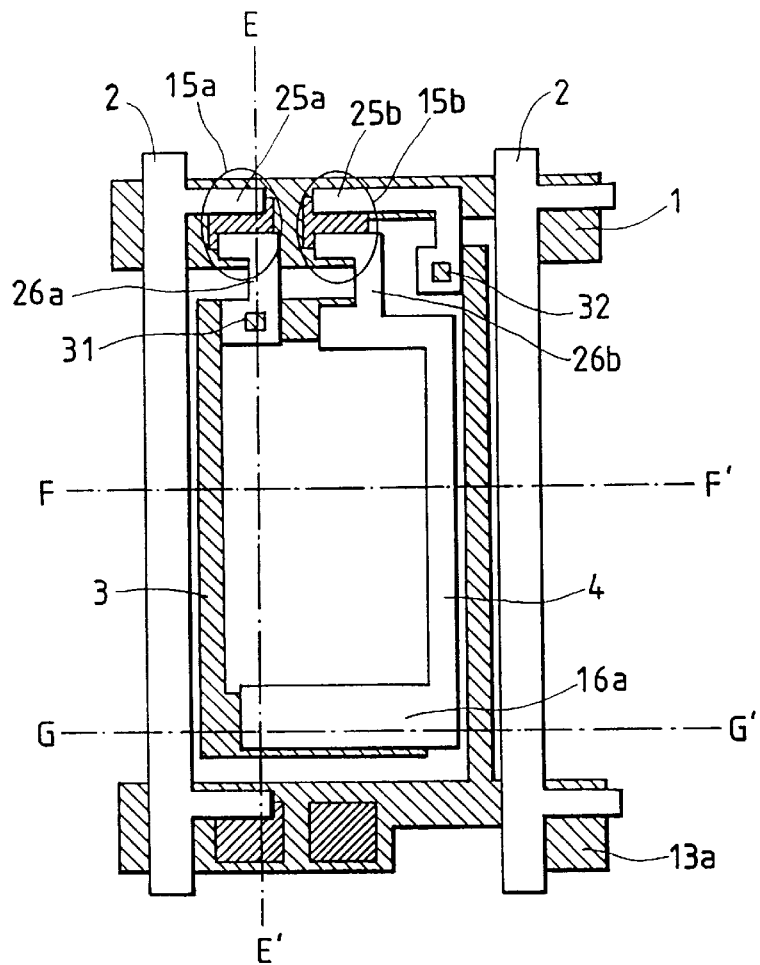
FIG. 21 is a front view showing the structure of a pixel in Embodiment 8 in accordance with the present invention.
Figure 22:
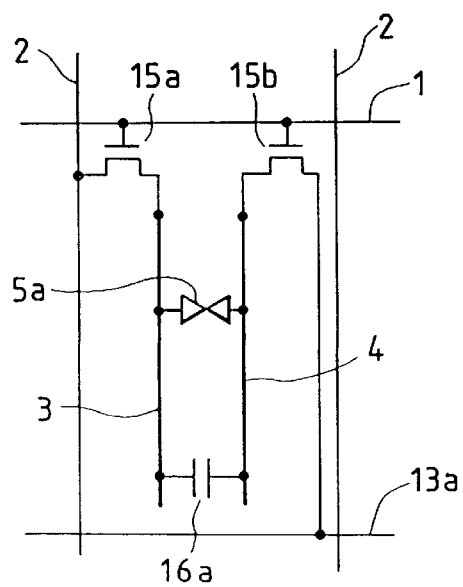
FIG. 22 is a view showing a passing through circuit of a pixel in Embodiment 8.
Figure 23:
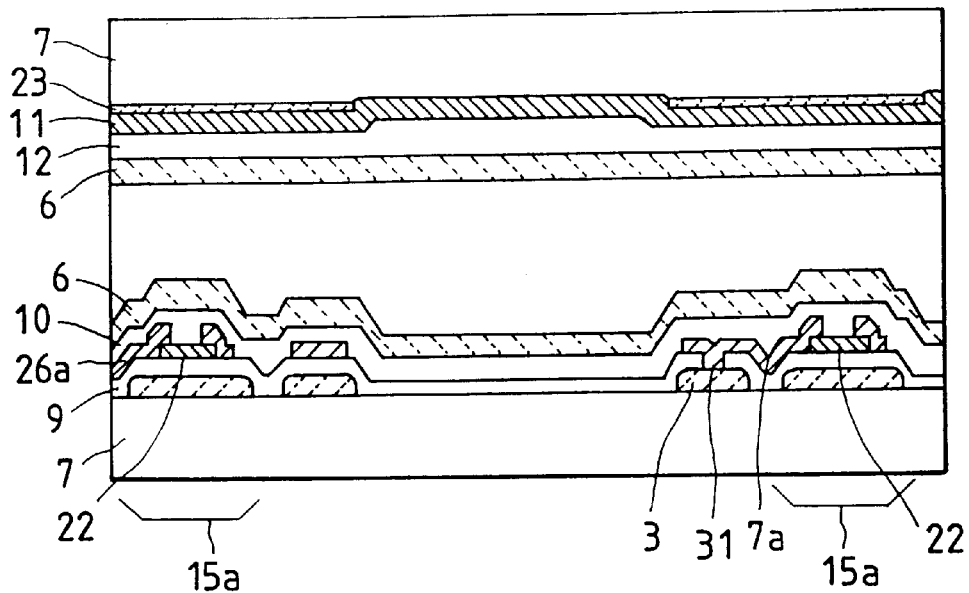
FIG. 23 is a cross-sectional side view taken along the line E-E' in FIG. 21.
Figure 24:
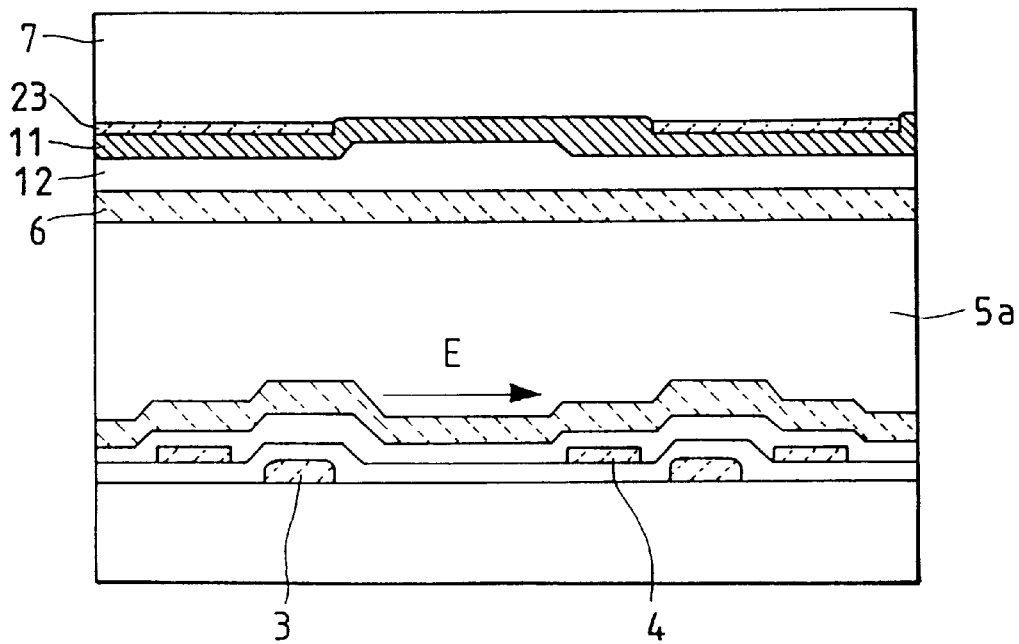
FIG. 24 is a cross-sectional side view taken along the line F-F' in FIG. 21.

In the embodiment, the pixel is constructed as shown in FIG. 21. The equivalent circuit of the pixel is as shown in FIG. 22. The cross-sectional view being taken on the line E-E' in FIG. 22 is shown in FIG. 23. The cross-sectional view being taken on the line F-F' in FIG. 22 is shown in FIG. 24.

Figure 25:
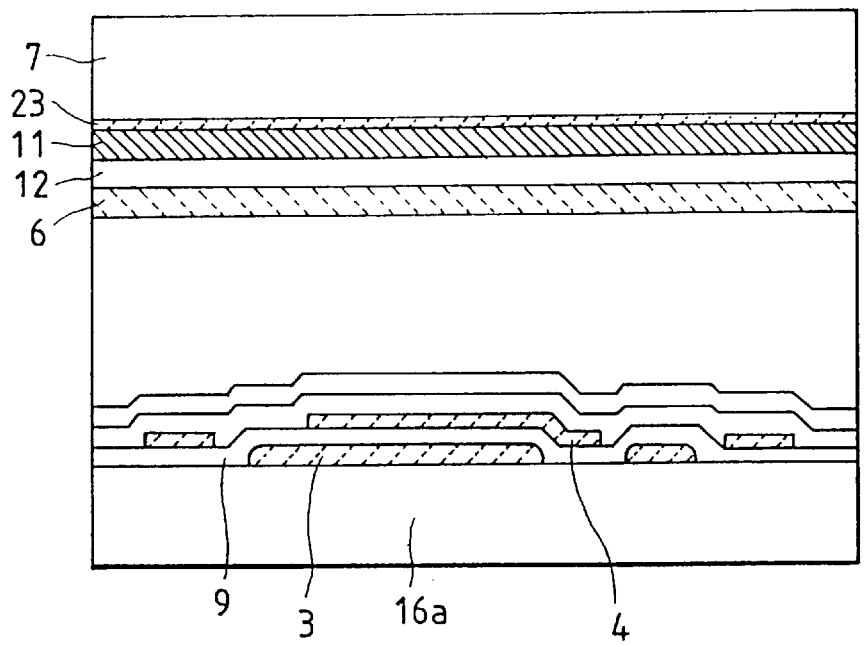
FIG. 25 is a cross-sectional side view taken along the line G-G' in FIG. 21.
Figure 26:
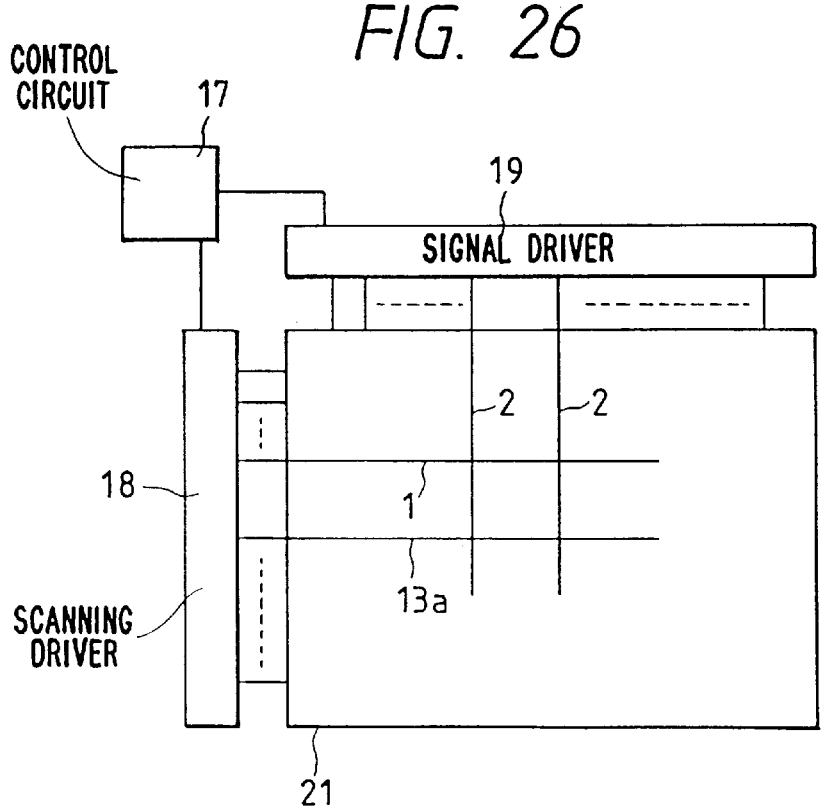
FIG. 26 is a view showing the construction of a display system in Embodiment 8 in accordance with the present invention.

The cross-sectional view being taken on the line G-G' in FIG. 22 is shown in FIG. 25. As shown in FIG. 21, thin film transistor elements 15a and 15b are formed in the pixel. As shown in FIG. 21, the signal voltage corresponding to an image is applied to a drain electrode 25a in the thin film transistor element 15a, and transmitted to the pixel electrode 3 through a source electrode 26a and a through hole 31. The voltage in a counter electrode 4 for giving a voltage difference is applied to the pixel electrode 3 from the scanning electrode 13a in the following row through a through hole 32, a drain electrode 25b of the thin film transistor element 15b, and a source electrode 26b. As shown in FIG. 25, a storage capacitance element 16a is formed with the pixel electrode 3, the counter electrode 4 and a gate insulator 9. There, the storage capacitance element 16a is provided to keep the voltage in the pixel electrode at a constant voltage by absorbing the noise due to the signal. As described above, two thin film transistor elements are provided in a single pixel so that, as shown in FIG. 24, the direction of the electric field E between the pixel electrode 3 and the counter electrode 4 mainly has the parallel or horizontal component. Although two thin film transistor elements are used there, three or more thin film transistor elements may be used for redundant structure. Similarly, two or more storage capacitance elements 16a may be used. Here, since the alignment between the pixel electrode 3 and the counter electrode 4 is performed only by using a photo-mask, the deviation in the electric field applied to the liquid layer is suppressed small. Further, since both of the source electrodes are formed on the same layer, the deviation in the distance d between the pixel electrode 3 and the counter electrode 4 can be suppressed less than 5%.

Figure 27:
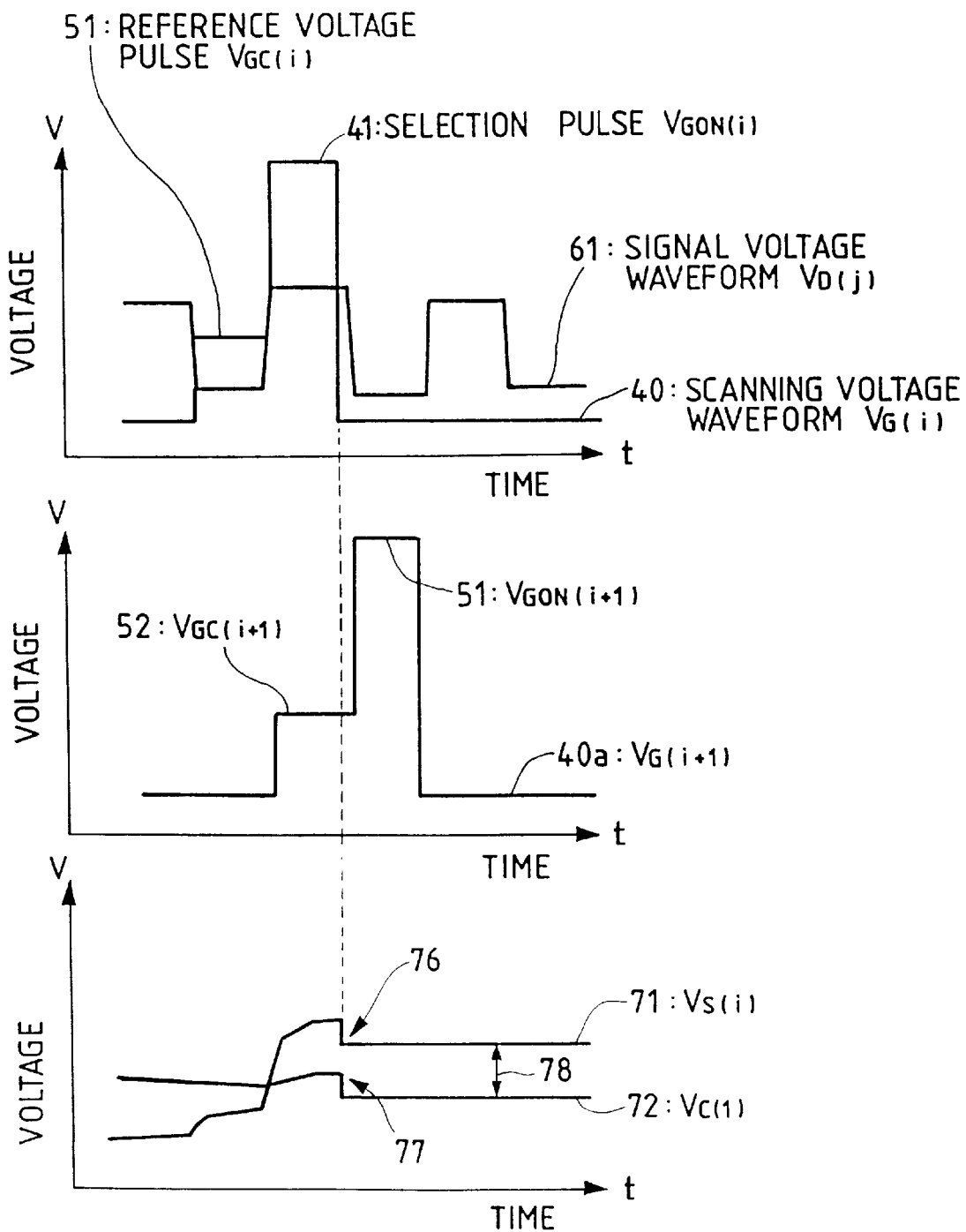
FIG. 27 is a chart showing the drive wave form in Embodiment 8 in accordance with the present invention.

The driving method will be described below. FIG. 27 shows the waveform of the voltage applied to each of the electrodes. Here is employed the line at a time method where signals are written row by row. The scanning voltage form 40: $V_{G(i)}$ is composed of the selective pulse 41: $V_{GON(i)}$ for selecting TFT's in a row and turning them into ON-state and counter electrode voltage pulse 51: $V_{C(i)}$ for giving the voltage $V_C$ to the counter electrode in the precedent row. The counter electrode voltage pulse 52: $V_{GC(i+1)}$ in the (i+1)-th row is applied nearly in synchronizing with the selective pulse 41: $V_{GON(i)}$ for the scanning line in the i-th row. Therefore, when the selective pulse 41 is applied to the scanning voltage waveform 40 for the line in the i-th row, the thin film transistor elements 15a and 15b are turned ON, the signal voltage wave from 61: $V_{D(j)}$ and the counter electrode voltage pulse 52: $V_{GC(i-1)}$, in the (i+1)-th row are written in the storage capacitance 16a and the liquid crystal 5a connecting to the signal electrode 2 and the scanning electrode 13a through the thin film transistor elements 15a and 15b respectively. After completion of the writing period (1 H) for the row, the scanning voltage waveform 40: $V_{G(i)}$ falls to the OFF level (non-selective voltage), the thin film transistor elements 15a and 15b turning into the OFF state, the written voltage is being kept. However, actually, the feedthrough voltage 76, 77 take place by the coupling noise due to the parasitic capacitances of the thin film transistor elements 5a and 5b, the written voltage is being kept at that voltage. Here, the voltage applied to the liquid crystal is the voltage 78 between the source voltages 71 and 72 in the thin film transistor elements 15a and 15b respectively. The brightness of the pixel (transmission ratio) is determined by the voltage 78.

In the embodiment, the counter electrode inter connections for applying voltage to the counter electrode is not required by means of giving the voltage from the scanning electrode in the following row to the counter electrode. Different from Embodiments 4, 5 and 6, the TFT does not require a high threshold voltage, the TFT having the threshold voltage of nearly zero or lower than zero can drive the liquid crystal with alternating current. In a conventional driving method, the direct current component in the voltage applied to liquid crystal is generated by the feedthrough voltage 76, 77 through the parasitic capacitances of the thin film transistor elements when the thin film transistor elements are turned from ON state to OFF state. In the embodiment, the direct current component in the voltage applied to liquid crystal is not generated since it is canceled by the two thin film transistor elements. Therefore, although in a conventional system the direct current component is corrected in a counter electrode voltage, no correction is required in the embodiment. And since the liquid crystal can be driven with alternating current, no flickering occurs. Similarly, the image-sticking due to direct current component is not recognized, the brightness gradation is not apparently observed. Further, in a case of employing two-terminal element such as MIM diode, the image degradation such as non-uniformity of brightness due to the deviation in the threshold of element being eliminated since the deviation is cancelled by two elements.

[Embodiment 9]

Figure 28:
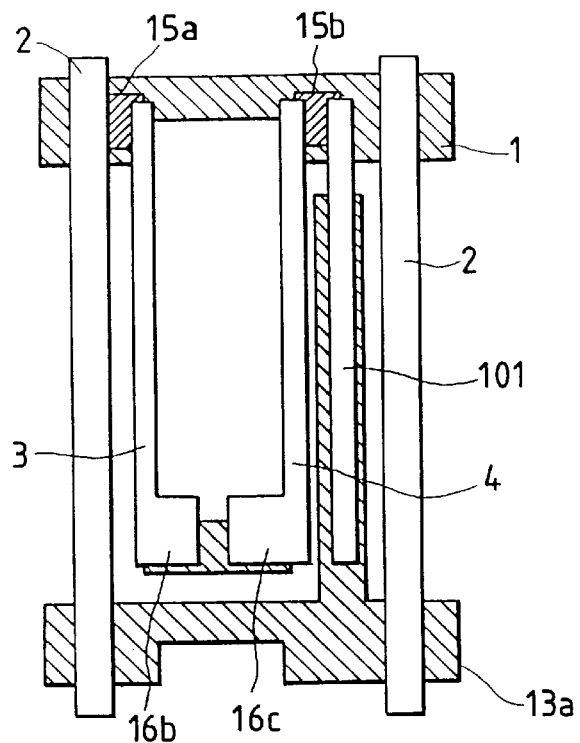
FIG. 28 is a front view showing the structure of a pixel in Embodiment 9 in accordance with the present invention.

The structure of this embodiment is the same as that in Embodiment 8 except the following items. FIG. 28 is a plane view showing a pixel in the embodiment, FIG. 29 being a diagram showing the equivalent circuit. The drain electrode in the thin film transistor element 15b giving voltage to the counter electrode 4 is connected to the scanning electrode 4 in the following row through a capacitance element 101. The capacitance element 6 for removing the noise due to signal connected between the pixel electrode 3 and the counter electrode 4 is composed of two capacitance elements 6a and 6b. By this structure, all the through holes required in Embodiment 8 can be eliminated. Therewith, the fabrication process such as patterning or holing on the insulator between layers in the pixel requiring fine patterning becomes unnecessary, the short circuit or the connection defect between the different layers due to the fault caused in an insulator fabrication process being eliminated. Furthermore, it can be realized to obtain a high quality liquid crystal display system by improving the opening ratio with decreasing the through hole region unrelated to display.

Figure 29:
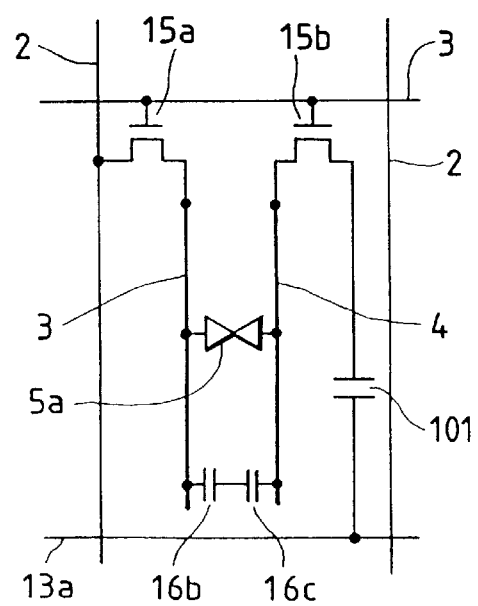
FIG. 29 is a view showing a passing through circuit of a pixel in Embodiment 9.

In a case of giving a voltage to the counter electrode 4 through capacitive coupling, as shown in FIG. 29, the voltage in the counter electrode 4 is determined by the ratio of the capacitance element 101 to the composite capacitance of the storage capacitances 16b and 16c. There, the voltage in the pixel electrode 3 is put as $V_{ds}$, the voltage in the scanning electrode in the following row as $V_{GC(i)}$, the voltage in the counter electrode 4 as $V_{C(i)}$, the capacitances of the liquid crystal and the storage capacitance s 16b and 16c as $C_{17}$, $C_{6a}$, $C_{6b}$ respectively, the composite capacitance of these capacitance as $C_{102}$, and the capacitance of the capacitance element 101 as $C_{101}$ Since the liquid crystal capacitance between the pixel electrode 3 and the counter electrode 4 is very small, the following relation can be obtained.

$$C_{102} = C_{17} + C_{6a} \times C_{6b})/(C_{6a} + C_{6b})$$

$$\approx (C_{6a} = \times C_{6b})/(C_{6a} + C_{6b}).$$

The voltage applied to the liquid crystal is as follows.

$$V_{D(j)} - V_{C(i)} = V_{D(j)} - \{(V_{D(j)} - V_{GC(i)}) \times C_{102}/(C_{101} + C_{102}) + V_{GC(i)}\}$$

$$= (V_{D(j)} - V_{GC(i)}) \times C_{102}/(C_{101} + C_{102}).$$

Therefore, if the capacitance $C_{101}$ of the capacitance element 101 is sufficiently larger than the composite capacitance $C_{102}$, the capacitance element 101 can apply the voltage sufficient enough to drive the liquid crystal. Even if the capacitance $C_{101}$ of the capacitance element 101 is 2 to 3 times as large as the composite capacitance $C_{102}$, the display characteristic is not affected only except the voltage amplitude in the scanning electrode in the following row becomes larger by 25% to 33%.

According to the embodiment, since the voltage in the counter electrode is given through capacitive coupling, the fabrication process such as patterning or holing on the insulator between layers becomes unnecessary, the opening ratio being improved with decreasing the through hole region unrelated to display. Furthermore, it can be realized to obtain a high quality liquid crystal display system in which has little faults due to the defects caused in the insulator fabrication process.

[Embodiment 10]

The structure of this embodiment is the same as that in Embodiment 8 except the following items.

Figure 30:
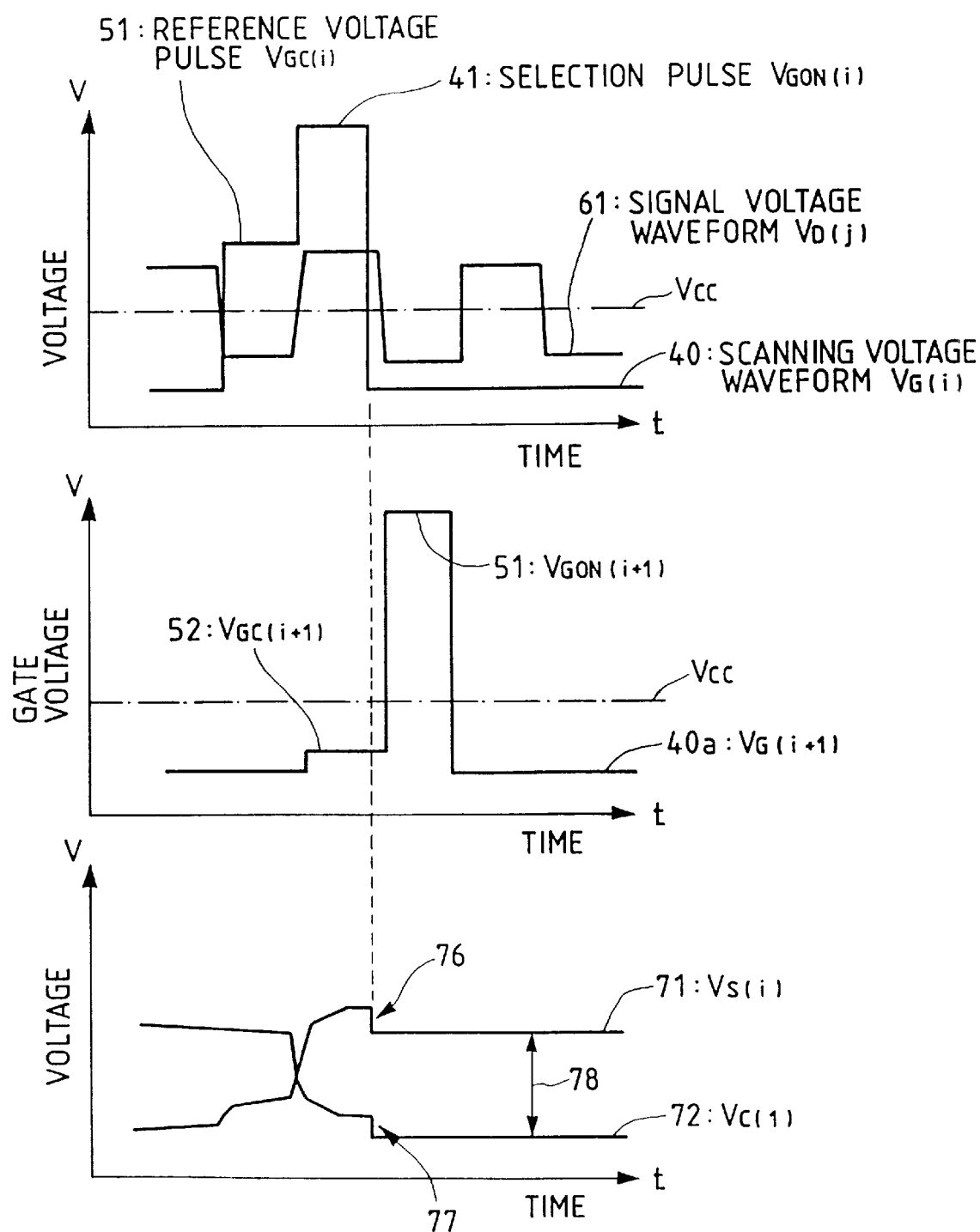
FIG. 30 is a chart showing the drive wave form in Embodiment 10 in accordance with the present invention.
Figure 31A:
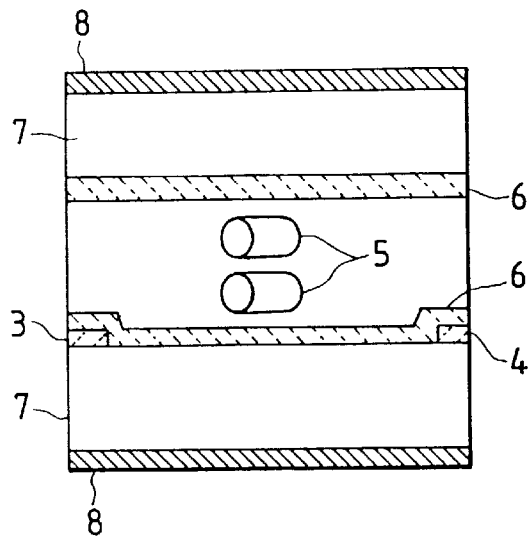
FIG. 31 is a view showing the operation of the liquid crystal in a liquid crystal display system in accordance with the present invention.
Figure 31B:
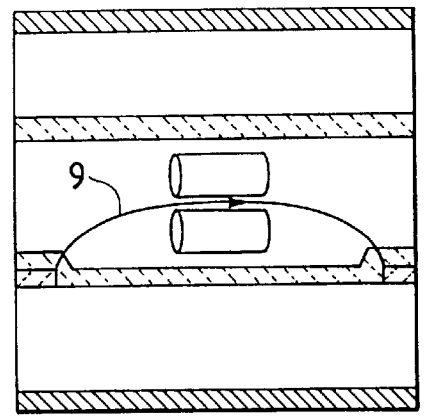
Figure 31C:
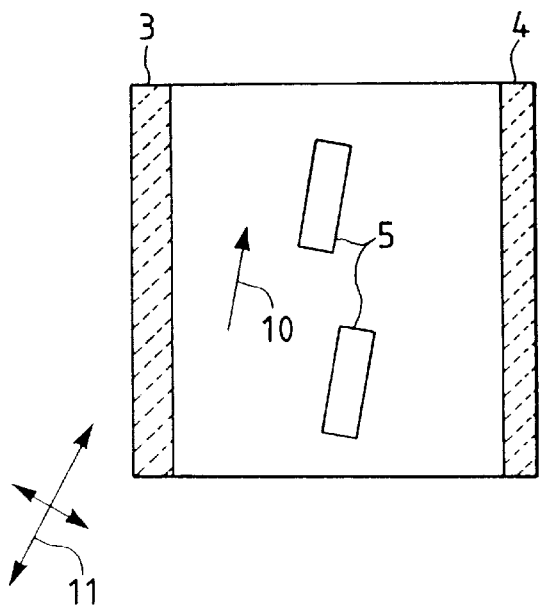
Figure 31D:
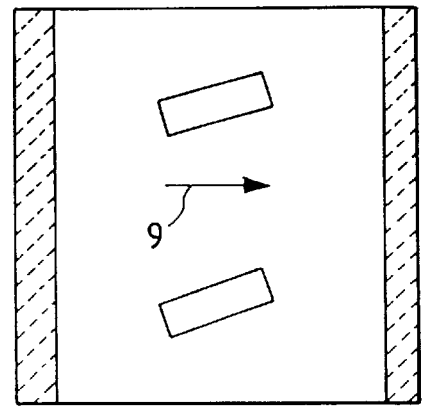

FIG. 30 shows the driving waveform. Although the structure of pixel and the equivalent circuit are the same as those in FIG. 21 and FIG. 22, the embodiment is characterized by that the polarity of the counter electrode voltage pulse 5: $V_{GC(i+1)}$ in the scanning voltage waveform 40: $V_{G(i+1)}$ is alternatively reversed by every row with the center of $V_{cc}$. Since the liquid crystal voltage is equal to the voltage difference between the signal voltage 61 and the counter electrode voltage pulse 52, the gate line inversion driving of liquid crystal with low voltage can be realized by means of alternatively reversing the counter electrode voltage pulse 52 in the scanning voltage waveform in the row following to the selected row. By means of selecting the amplitudes of the counter electrode voltages 51 and 52 properly and setting the signal voltage and the center value of the counter voltage nearly equal to each other, the amplitude of the signal voltage can be minimized.

In the embodiment, by means of selecting the drive conditions as described above, it can be realized that the maximum amplitude of the voltage in the signal driver is decreased and the flickering is decreased by using the gate line inversion method.

[Embodiment 11]

The structure of this embodiment is the same as that in Embodiment 10 except the following items.

FIG. 31 is a plan view showing 2 rows by 2 columns of pixels in the embodiment, and FIG. 32 being a diagram showing the equivalent circuit, FIG. 33 showing the driving waveform. The whole display area is constructed by repeating this configuration of pixels. Although the structure of the pixel is the same as that in the first embodiment shown in FIG. 21, the characteristic feature of the embodiment is as follows. The counter electrode 4 receiving voltage from scanning electrode is alternatively connected by every column to the scanning electrode 1 or 13a, and concerning the driving method, the two kind of the counter electrode voltage are alternatively applied to the scanning electrode by every column during the scanning period whereas in Embodiment 10 the two kind of the counter electrode voltage are alternatively applied to the scanning electrode by every row.

According to the embodiment, the polarity of voltage to charging in the liquid crystal can be alternatively reversed by every column, and it can be further realized that the horizontal smear is prevented by means of charging the signal voltage having the reversed polarity on the scanning electrode to cancel the cross-talk current, and at the same time the signal voltage is lowered. Furthermore, by means of alternatively reversing the polarity by every column, it can be also realized that the vertical smear is prevented and a high image quality and low voltage drive.

Although the present invention has been described referring to an embodiment on a transmitting type liquid crystal display system, the present invention is also effective for a reflection type liquid crystal display system. Concerning the thin film transistor, the structure (normal stagger structure, inverted stagger structure, coplaner structure and so on) and the material are not limited to the above embodiment.

A part or the whole of peripheral circuits (signal driver, scanning driver, counter driver circuit) may be directly attached to the surface of the substrate 7 composing the panel to form an IC chip. A part or the whole of peripheral circuits may be formed in a unit on the surface of the substrate 7 using, for example, polysilicone. By doing so, there is an effect that the whole display system can be made smaller than that in a case of forming the peripheral circuits outside the display panel.

Various kinds of office automation machines or portable machines can be constructed by combining the liquid crystal display system with an processor, a memory, an input unit, an output unit, a communication unit and so on.

According to the present invention, in the method of switching liquid crystal by using the electric field in parallel to the interface of substrate, the voltage in the signal electrode is lowered by means of modulating the voltage in the scanning electrode, and low drive voltage and high opening ratio in pixel are accomplished. Thus, it becomes possible to provide a thin film transistor type liquid crystal display system being low power dissipation and bright and excellent in visibility. Concurrently, the cross-talk (horizontal smear), which has been a problem the driving method modulating the voltage in scanning electrode, can be suppressed, and it becomes possible to provide a thin film transistor liquid crystal display system having a high image quality. Further, by means of controlling the threshold voltage of the thin film transistor element or constructing both the e-type thin film transistor element and the p-type thin film transistor element, the scanning electrode can also serve as a counter electrode interconnection and can be driven with low voltage. Furthermore, by means of utilizing two thin film transistor elements in a pixel, the counter electrode voltage can be supplied through the scanning electrode, and the drive voltage can be lowered and the image quality can be improved.

What is claimed is:

1. An active matrix type liquid crystal display system comprising:

a first substrate having on one surface a plurality of scanning electrodes, a plurality of signal electrodes formed to intersect with said plurality of scanning electrodes, a switching element formed in each of the intersecting portions of said plurality of scanning electrodes and said plurality of signal electrodes, a pixel electrode connected to said switching element, a counter electrode formed so as to face said pixel electrode;

a second substrate placed so as to face said first substrate;

a liquid crystal component interposed in a gap between said first substrate and said second substrate;

a signal driver supplying an image signal to each of said plurality of signal electrodes; and a scanning driver applying a scanning signal to each of said plurality of scanning electrodes to produce a display;

wherein a first voltage is applied between said pixel electrode and said counter electrode to generate an electric field to said liquid crystal component which is predominantly in parallel to said first and second substrates, a second voltage obtained by adding a third voltage of different polarity to a base voltage is applied to said counter electrode, and a fourth voltage is applied to at least one of said plurality of scanning electrodes so as to maintain a difference between a voltage of said scanning electrode and said second voltage applied to said counter electrode neighboring said scanning electrode.

2. An active matrix liquid crystal display system according to claim 1, wherein each counter electrode is connected to said counter electrode which is provided in parallel to said scanning electrode neighboring said counter electrode.

3. An active matrix liquid crystal display system according to claim 1, wherein each counter electrode is connected to said counter electrode which is provided in parallel to said signal electrode neighboring said counter electrode.

4. An active matrix liquid crystal display system according to claim 2, wherein at least one of said counter electrodes is also used for both pixel electrodes, which is provided in parallel to one of said signal electrodes, neighboring said at least one counter electrode.

5. An active matrix liquid crystal display system according to claim 3, wherein at least one of said counter electrodes is also used for both pixel electrodes, which is provided in parallel to one of said signal electrodes, neighboring said at least one counter electrode.

6. An active matrix liquid crystal display system according to claim 1, wherein a changing direction in an amplitude direction of the fourth voltage applied to each scanning electrode in its non-selection period is the same as that of the second voltage applied to said counter electrode.

7. An active matrix liquid crystal display system according to claim 1, wherein a phase of the fourth voltage applied to each scanning electrode in its non-selection period is substantially the same as that of the second voltage applied to said counter electrode.

8. An active matrix liquid crystal display system according to claim 1, wherein amplitudes of the fourth voltage applied to each scanning electrode in its non-selection period is substantially the same as that of the second voltage applied to said counter electrode.

9. An active matrix liquid crystal display system according to claim 2, wherein a changing direction in an amplitude direction of the fourth voltage applied to each scanning electrode in its non-selection period is the same as that of the second voltage applied to said counter electrode.

10. An active matrix liquid crystal display system according to claim 2, wherein a phase of the fourth voltage applied to each scanning electrode in its non-selection period is substantially the same as that of the second voltage applied to said counter electrode.

11. An active matrix liquid crystal display system according to claim 2, wherein amplitudes of the fourth voltage applied to each scanning electrode in its non-selection period is substantially the same as that of the second voltage applied to said counter electrode.

12. An active matrix liquid crystal display system according to claim 3, wherein a changing direction in an amplitude direction of the fourth voltage applied to each scanning electrode in its non-selection period is the same as that of the second voltage applied to said counter electrode.

13. An active matrix liquid crystal display system according to claim 3, wherein a phase of the fourth voltage applied to each scanning electrode in its non-selection period is substantially the same as that of the second voltage applied to said counter electrode.

14. An active matrix liquid crystal display system according to claim 3, wherein amplitudes of the fourth voltage applied to each scanning electrode in its non-selection period is substantially the same as that of the second voltage applied to said counter electrode.

15. An active matrix liquid crystal display system according to claim 1, wherein the fourth voltage applied to each scanning electrode in its non-selection period is synchronized with the second voltage applied to said counter electrode neighboring said scanning electrodes.

16. An active matrix liquid crystal display system according to claim 1, wherein each pixel electrode is superimposed on a corresponding one of said scanning electrodes via an insulation film.

17. An active matrix liquid crystal display system according to claim 1, wherein each pixel electrode and a corresponding one of said counter electrodes have a part at which said pixel electrode and said counter electrode are superimposed on each other, and a capacity is formed at said part, said capacity being larger than a capacity formed between said pixel electrode and a part opposite to said counter electrode.

18. An active matrix liquid crystal display system according to claim 17, wherein each pixel electrode and a corresponding one of said scanning electrodes have a part at which said pixel electrode and said scanning electrode are superimposed on each other, and a capacity is formed at said part, said capacity being larger than the capacity formed between said pixel electrode and a corresponding one of said counter electrodes.

19. An active matrix liquid crystal display system according to claim 1, wherein each pixel electrodes and a corresponding one of said scanning electrodes have a part at which said pixel electrode and said scanning electrode are superimposed on each other, and a capacity is formed at said part, said capacity being larger than a capacity formed between said pixel electrode and a corresponding one of said counter electrodes.

20. An active matrix liquid crystal display system according to claim 1, wherein a period of changes of the second voltage applied to said counter electrode is longer than twice a period of scanning, and a period of changes of the fourth voltage applied to said scanning electrode in the non-selection period is shorter than twice the period of scanning.

21. An active matrix liquid crystal display system comprising:
    a first substrate having on one surface a plurality of scanning electrodes, a plurality of signal electrodes formed to intersect with said plurality of scanning electrodes, a switching element formed in each of the intersecting portions of said plurality of scanning electrodes and said plurality of signal electrodes, a pixel electrode connected to said switching element, a counter electrode formed so as to face said pixel electrode;
    a second substrate placed so as to face said first substrate;
    a liquid crystal component interposed in a gap between said first substrate and said second substrate;
    a signal driver supplying an image signal to each of said plurality of signal electrodes;
    a scanning driver applying a scanning signal to each of said plurality of scanning electrodes to produce a display; and
    a common part for connecting each counter electrode to ones of said counter electrodes, neighboring said counter electrode, in a direction parallel to said scanning electrodes;
    wherein first voltage is applied between said pixel electrode and said counter electrode to generate an electric field to said liquid crystal component which is predominantly in parallel to said substrates, a second voltage obtained by adding a third voltage of different polarity to a base voltage is applied to said counter electrode, and a fourth voltage is applied to at least one of said plurality of scanning electrode so as to maintain constant a difference between a voltage of said scanning electrode and said second voltage applied to said counter electrode neighboring said scanning electrode.

22. An active matrix liquid crystal display system according to claim 21, wherein a changing direction in an amplitude direction of the fourth voltage applied to each scanning electrode in its non-selection period is the same as that of the second voltage applied to said counter electrode.

23. An active matrix liquid crystal display system according to claim 21, wherein a phase of the voltage applied to each scanning electrode in its non-selection period is substantially the same as that of the second voltage applied to said counter electrode.

24. An active matrix liquid crystal display system according to claim 21, wherein amplitudes of the fourth voltage applied to each scanning electrode in its non-selection period is substantially the same as that of the second voltage applied to said counter electrode.

25. An active matrix liquid crystal display system according to claim 21, wherein the fourth voltage applied to each scanning electrode in its non-selection period is synchronized with the second voltage applied to said counter electrode neighboring said scanning electrodes.

26. An active matrix liquid crystal display system according to claim 21, wherein each pixel electrode is superimposed on a corresponding one of said counter electrodes via an insulation film.

27. An active matrix liquid crystal display system according to claim 26, wherein each pixel electrode and a corresponding one of said counter electrodes have a part at which said pixel electrode and said counter electrode are superimposed on each other, and a capacity is formed at said part, said capacity being larger than a capacity formed between said pixel electrode and a part opposite to said counter electrode.

28. An active matrix liquid crystal display system according to claim 21, wherein a period of changes of the second voltage applied to said counter electrode is longer than twice a period of scanning, and a period of changes of the fourth voltage applied to said scanning electrode in the non-selection period is shorter than twice the period of scanning.

* * * * *